US010652549B2

(12) United States Patent
Miyoshi

(10) Patent No.: US 10,652,549 B2
(45) Date of Patent: May 12, 2020

(54) VIDEO CODING DEVICE, VIDEO CODING METHOD, VIDEO DECODING DEVICE, AND VIDEO DECODING METHOD

(71) Applicant: FUJITSU LIMITED, Kawasaki-shi, Kanagawa (JP)

(72) Inventor: Hidenobu Miyoshi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 132 days.

(21) Appl. No.: 16/032,606

(22) Filed: Jul. 11, 2018

(65) Prior Publication Data
US 2019/0028711 A1    Jan. 24, 2019

(30) Foreign Application Priority Data

Jul. 19, 2017    (JP) ................. 2017-140067

(51) Int. Cl.
| | |
|---|---|
| *H04N 19/159* | (2014.01) |
| *H04N 19/107* | (2014.01) |
| *H04N 19/182* | (2014.01) |
| *H04N 19/176* | (2014.01) |
| *H04N 19/577* | (2014.01) |
| *H04N 19/553* | (2014.01) |

(Continued)

(52) U.S. Cl.
CPC ......... *H04N 19/159* (2014.11); *H04N 19/107* (2014.11); *H04N 19/109* (2014.11); *H04N 19/167* (2014.11); *H04N 19/176* (2014.11); *H04N 19/182* (2014.11); *H04N 19/553* (2014.11); *H04N 19/577* (2014.11)

(58) Field of Classification Search
None
See application file for complete search history.

(56) References Cited

U.S. PATENT DOCUMENTS

2014/0294078 A1*   10/2014  Seregin ............... H04N 19/176
                                                    375/240.15
2016/0065988 A1*   3/2016   Kawamura .......... H04N 19/593
                                                    375/240.12

FOREIGN PATENT DOCUMENTS

| JP | 11-98514 | 4/1999 |
|---|---|---|
| JP | 2005-329779 | 12/2005 |
| JP | 2014-195142 | 10/2014 |

OTHER PUBLICATIONS

ITU-T, "High Efficiency Video Coding", Recommendation ITU-T H.265, Apr. 2013, pp. 317.

* cited by examiner

*Primary Examiner* — Lindsay J Uhl
(74) *Attorney, Agent, or Firm* — Staas & Halsey LLP

(57) ABSTRACT

A region determination circuit determines, for a first block encoded by referring to a first prediction block generated by applying a bidirectional prediction mode for a first component of a pixel value from among blocks in a coding-target picture included in video data, a partial region to which a unidirectional prediction mode is to be applied for a second component on the basis of a difference value for the first component between corresponding pixels belonging to the first prediction block and the first block. A prediction circuit generates a second prediction block for the second component by applying a unidirectional prediction mode to the partial region and a bidirectional prediction mode to a region that is not the partial region. An encoder calculates a prediction error for the second component between corresponding pixels belonging to the first block and the second prediction block and encodes the prediction error.

20 Claims, 13 Drawing Sheets

(51) Int. Cl.
*H04N 19/109* (2014.01)
*H04N 19/167* (2014.01)

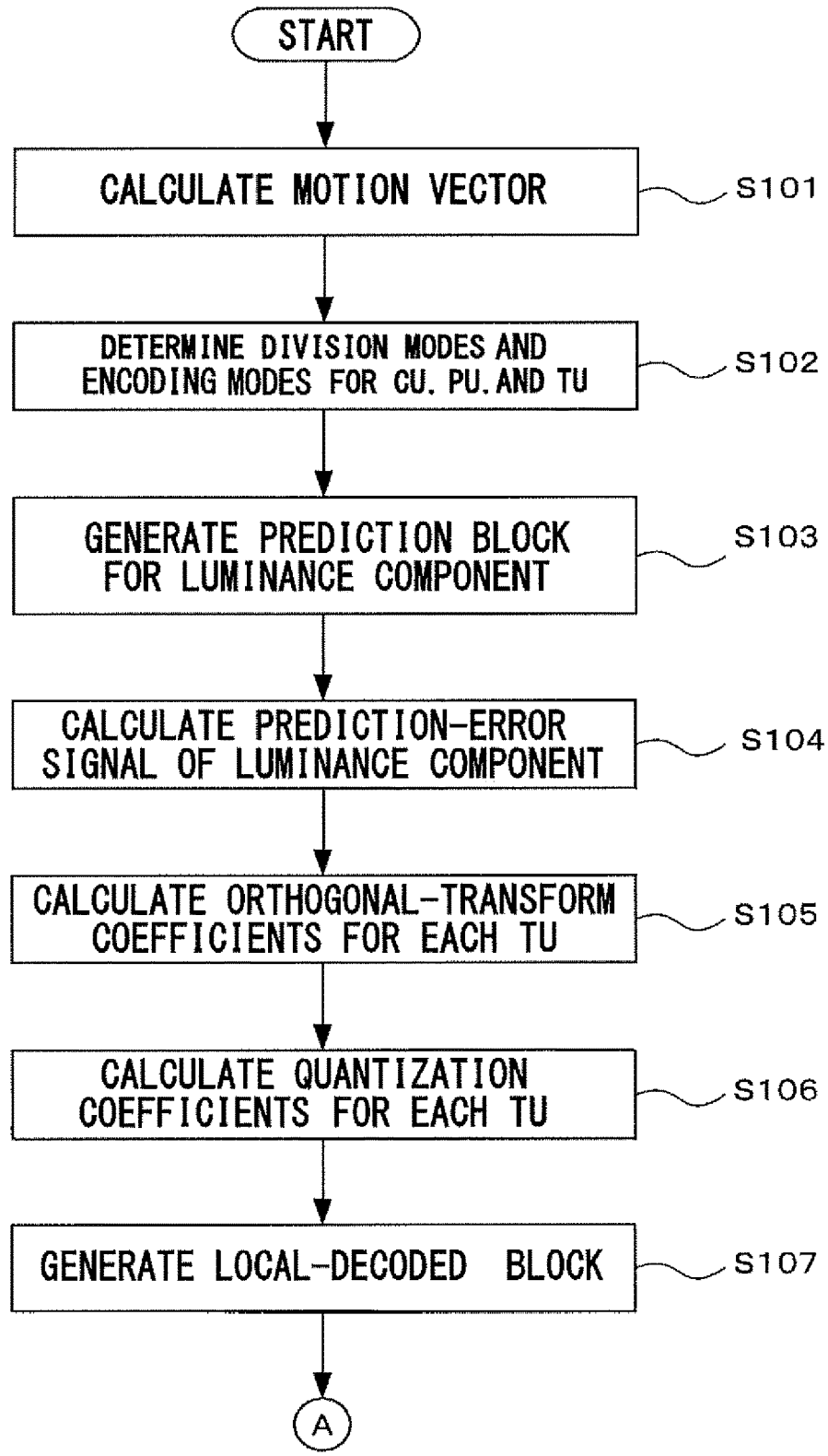
F I G. 6 A

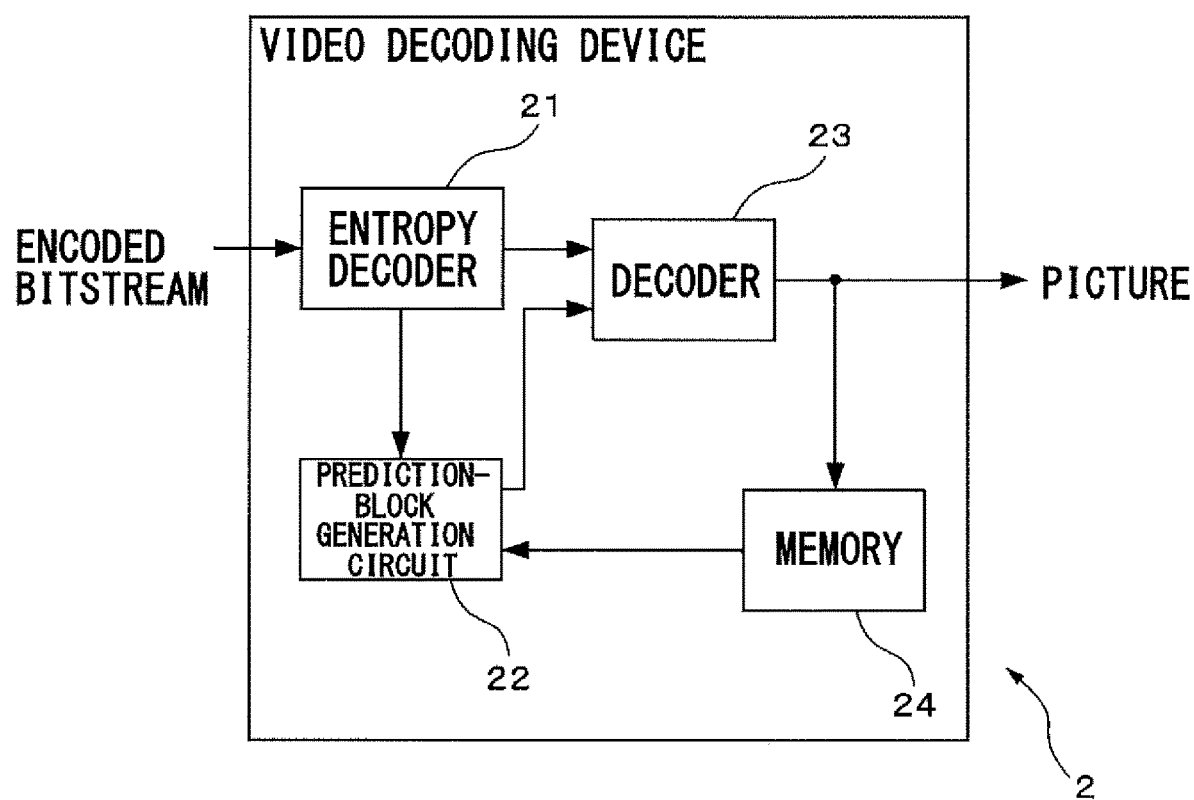
F I G. 7

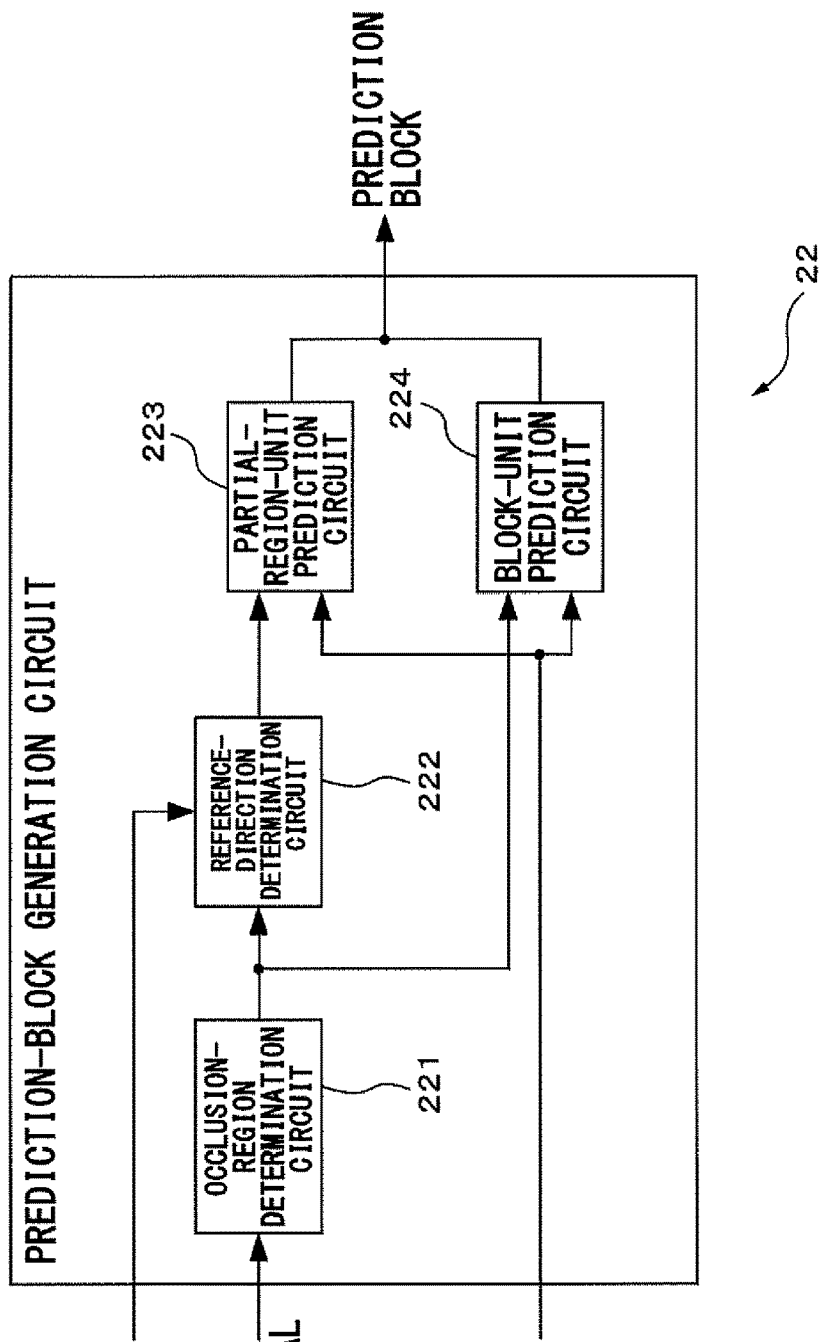
F I G. 8

VIDEO CODING DEVICE, VIDEO CODING METHOD, VIDEO DECODING DEVICE, AND VIDEO DECODING METHOD

CROSS-REFERENCE TO RELATED APPLICATION

This application is based upon and claims the benefit of priority of the prior Japanese Patent Application No. 2017-140067, filed on Jul. 19, 2017, the entire contents of which are incorporated herein by reference.

FIELD

The embodiments discussed herein are related to for example a video coding device and a video coding method that encode a coding-target picture by using information of a different picture, and to a video decoding device and a video decoding method that decode a picture that has been encoded by using information of a different picture.

BACKGROUND

Video data typically has an immense amount of data. Accordingly, a device treating video data encodes video data to compress the video data when transmitting the video data to a different device or storing the video data in a storage device. Advanced Video Coding (MPEG-4 AVC|ITU-T H.264) and High Efficiency Video Coding (HEVC|ITU-T H.265) are being developed as representative standards for video coding (see Non-Patent Document 1 for example).

These coding standards divide a coding-target picture into blocks. For each coding-target block, a prediction block is generated from an already-encoded different picture or an already-encoded region of a coding-target picture, the difference is encoded between the coding-target block and the prediction block, and thereby the redundancy is reduced.

Coding standards such as this employ the inter-prediction coding method, in which a reference picture (also referred to as a local-decoded picture) obtained by decoding an already-encoded different picture is used for generating a prediction block. In the inter-prediction coding method, the region that resembles a coding-target block the most is obtained as a reference block from the reference picture to compensate for motion between pictures. On the basis of that reference block, a prediction block is generated. The inter-prediction coding method can typically achieve higher compression efficiency than that achieved by the intra-prediction coding method, which generates a prediction block from an encoded region in a coding-target picture.

The inter-prediction coding method includes a bidirectional prediction mode (bi-predictive mode), in which two reference blocks are used for generating one prediction block, and a unidirectional prediction mode, in which one reference block is used for generating a prediction block. One of the two reference blocks used in a bidirectional prediction mode may be included in a reference picture that is earlier than the coding-target picture in the order of display time, and the other reference block may be included in a reference picture that is later than the coding-target picture in the order of display time. Both of the two reference pictures may be included in different reference pictures that are earlier than the coding-target picture in the order of display time or may be included in different two reference pictures that are later than the coding-target picture in the order of display time. Using a bidirectional prediction mode reduces the influence of image-pickup noise and coding noise involved in a reference block, enabling the video coding device to generate a prediction block with higher accuracy. This results in increased coding efficiency. A unidirectional prediction mode, meanwhile, enables the video coding device to generate a prediction block by using one of the two reference blocks used in a bidirectional prediction mode. Such types of prediction are referred to as L0 prediction and L1 prediction in for example HEVC. L0 prediction and L1 prediction are performed when only one reference picture exists, when one of the reference pictures does not have a region that resembles the coding-target block and that is to serve as a reference block, or in other cases.

Coding standards such as MPEG-4 AVC or HEVC apply these inter-prediction coding methods efficiently, and introduce three types of picture: I picture, P picture, and B picture in order to suppress the propagation of an error caused by the coding between pictures. An I picture is a picture that is encoded by only using the intra-prediction coding method from between the inter-prediction coding method and the intra-prediction coding method. A P picture is a picture that is encoded by using a unidirectional prediction mode (L0/L1 prediction) or the intra-prediction coding method. A B picture is a picture that is encoded by using the intra-prediction coding method, a unidirectional prediction mode, or a bidirectional prediction mode. Note that a different coding method and a different prediction mode can be selected for each block from among applicable coding methods and prediction modes for a P picture and a B picture.

Also, when the video data is a color video, the value of a pixel in each picture is expressed by for example a set of a luminance component and two color-difference components. Accordingly, when the video coding device encodes video data, the video coding device encodes for example not only the luminance component but also each of the two color-difference components. In such a situation, the luminance component and the two color-difference components typically have correlation. In view of this, HEVC specifies that a motion vector calculated from a luminance component can be applied to each of the two color-difference components for a block of interest when a video coding device performs inter-prediction coding on the luminance component and each of the two color-difference components. HEVC also specifies that a mode of dividing a block determined on the basis of a luminance component may be applied to each of the two color-difference components (see for example section 8.5.3.2.9 of Non-Patent Document 1).

Non-Patent Document 1: ITU-T Recommendation H.265|ISO/IEC 23008-2 "High Efficiency Video Coding", April 2013

SUMMARY

According to an aspect of the embodiments, a video coding device that encodes a coding-target picture included in video data is provided. This video coding device includes a region determination circuit configured to determine, for a first block encoded by referring to a first prediction block generated by applying a bidirectional prediction mode for a first component of a pixel value from among a plurality of blocks resulting from dividing the coding-target picture, a partial region to which a unidirectional prediction mode is to be applied for a second component of a pixel value on the basis of a difference value for the first component between corresponding pixels belonging to the first prediction block and the first block, a prediction circuit configured to generate a second prediction block for the second component by applying a unidirectional prediction mode to the partial region in the first block and by applying a bidirectional prediction mode to a region that is not the partial region in the first block, and an encoder configured to calculate a prediction error between corresponding pixels belonging to the first block and the second prediction block for the second component and to encode the prediction error.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6A illustrates a first part of an operation flowchart for a video coding process;

FIG. 7 illustrates a configuration of a video decoding device;

FIG. 8 is a block diagram of a prediction-block generation circuit;

DESCRIPTION OF EMBODIMENTS

Figure 1:
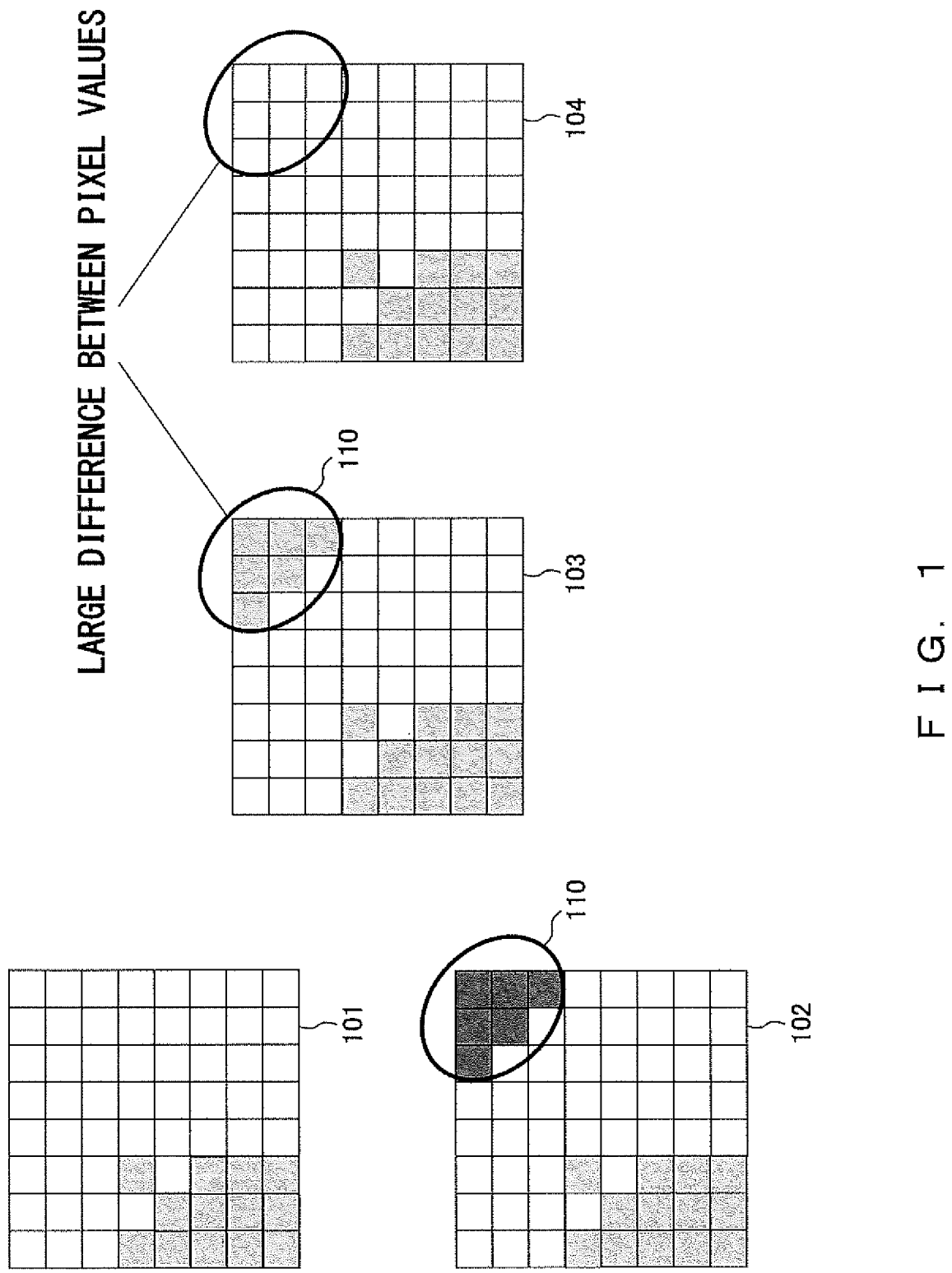
FIG. 1 illustrates examples of two reference blocks, a prediction block, and a coding-target block.

Hereinafter, explanations will be given for a video coding device according to one embodiment by referring to the drawings.

As described above, a different prediction mode can be selected for each block from among applicable prediction modes for a B picture. This leads to a situation in which when a subject (which will hereinafter be referred to as an obstacle for the sake of convenience of the explanations) included in only one of the two reference blocks exists, a prediction block generated through a bidirectional prediction mode includes the information of the obstacle. According to HEVC for example, a weighting average value of the pixel values for each pair of corresponding pixels belonging to the two reference blocks is calculated as the value of the corresponding pixel of a prediction block, and thereby the prediction block is generated in a bidirectional prediction mode. This means that when one of the reference blocks includes an obstacle, the weighting average value between a pixel value expressing the obstacle and a pixel value not expressing the obstacle (for example a pixel value expressing an object farther than the obstacle) is the pixel value of the corresponding pixel in the prediction block for a pixel including the obstacle. This results in insufficient accuracy for the generated prediction block regardless of whether the coding-target block includes an obstacle.

Explanations will first be given for a prediction block generated when one of the two reference blocks includes an obstacle in a bidirectional prediction mode.

FIG. 1 illustrates examples of two reference blocks, a prediction block, and a coding-target block. In this example, of an L0-prediction block 101 and an L1-prediction block 102, which are serving as reference blocks, the L1-prediction block 102 includes an obstacle 110 in its upper right portion, and the obstacle 110 causes occlusion. As a result of this, the obstacle 110 influences the values of the pixels in the upper right portion even in a prediction block 103 generated from the L0-prediction block 101 and the L1-prediction block 102. This results in greater differences, between the coding-target block 104 and the prediction block 103, in pixel values that are influenced by the obstacle 110. As a result, the efficiency deteriorates in encoding the coding-target block 104. In such a case, it may be possible to generate, in a unidirectional prediction mode, a prediction block on the basis of the L0-prediction block 101 that resembles the coding-target block 104 more from between the two reference blocks. However, a bidirectional prediction mode typically can generate a prediction block with higher accuracy than a unidirectional prediction mode. Accordingly, the prediction block 103 is more likely to resemble the coding-target block 104 than a prediction block generated in a unidirectional prediction mode for a region not including the obstacle 110.

In view of this, the video coding device according to the present embodiment determines whether the coding-target block to which a bidirectional prediction mode is applied includes a partial region with a large prediction error calculated for one component (such as a luminance component) of a pixel value. When a partial region with a large prediction error is included, the video coding device applies a unidirectional prediction mode to that partial region in the coding-target block for a different component (such as a color-difference component) of the pixel value so as to generate a prediction block.

Note that a picture may be a frame or may be a field. A frame is one still image in video data, and a field is a still image obtained by only extracting data of either the odd-numbered lines or the even-numbered lines from a frame.

It is assumed in the present embodiment that the value of each pixel in a picture included in video data is expressed by a YUV color coordinate system. In other words, the value of each pixel in a picture includes a luminance (Y) component and two color-difference (U, V) components. It is also assumed that each picture is expressed in a format of 4:4:4. However, each picture may be expressed in a format of 4:2:2 or a format of 4:2:0. When a format of 4:2:2 or a format of 4:2:0 is applied, a block of respective color-difference components corresponding to the block set in the picture for luminance components is assumed to be shrunk in accordance with the ratio between the picture size of the luminance component and the picture size of the color-difference components.

It is also assumed that the video coding device encodes video data according to HEVC in the present embodiment. However, the video coding device may encode video data in accordance with a different coding standard to which a bidirectional prediction mode can be applied.

Figure 2:
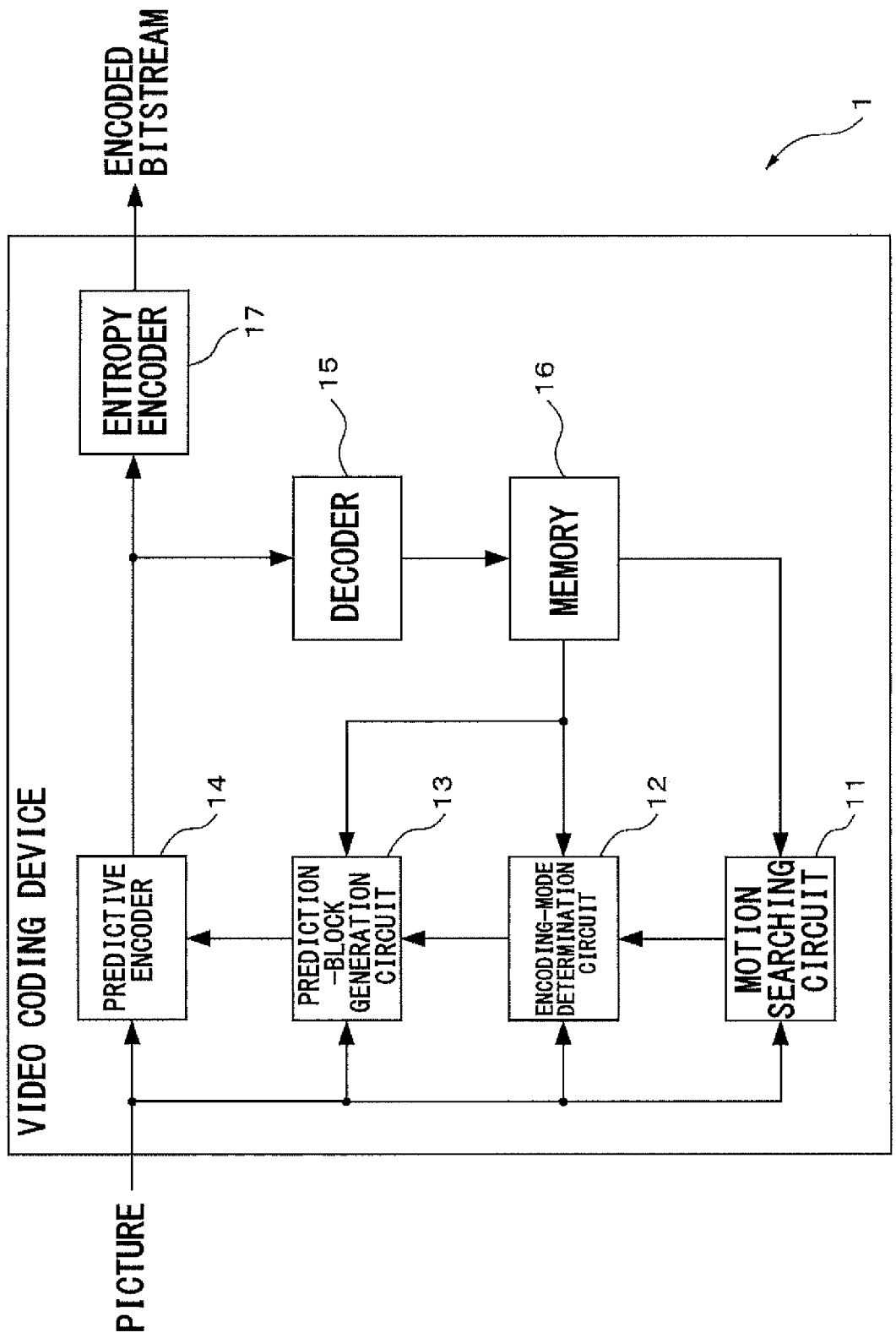
FIG. 2 illustrates a configuration of a video coding device according to an embodiment.

FIG. 2 illustrates a configuration of a video coding device according to an embodiment. A video coding device 1 includes a motion searching circuit 11, an encoding-mode determination circuit 12, a prediction-block generation circuit 13, a predictive encoder 14, a decoder 15, a memory 16, and an entropy encoder 17.

Each of the constituents belonging to the video coding device 1 is formed as a separate circuit. Alternatively, the constituents belonging to the video coding device 1 may be mounted on the video coding device 1 as an integrated circuit in which circuits corresponding to the constituents are integrated. Further, the functions of the constituents belonging to the video coding device 1 may be implemented by a processor included in the video coding device 1 executing a computer program.

In HEVC according to which the video coding device 1 operates, each picture included in video data is divided in a plurality of steps. Thus, the division of a picture in HEVC will first be explained.

Figure 3:
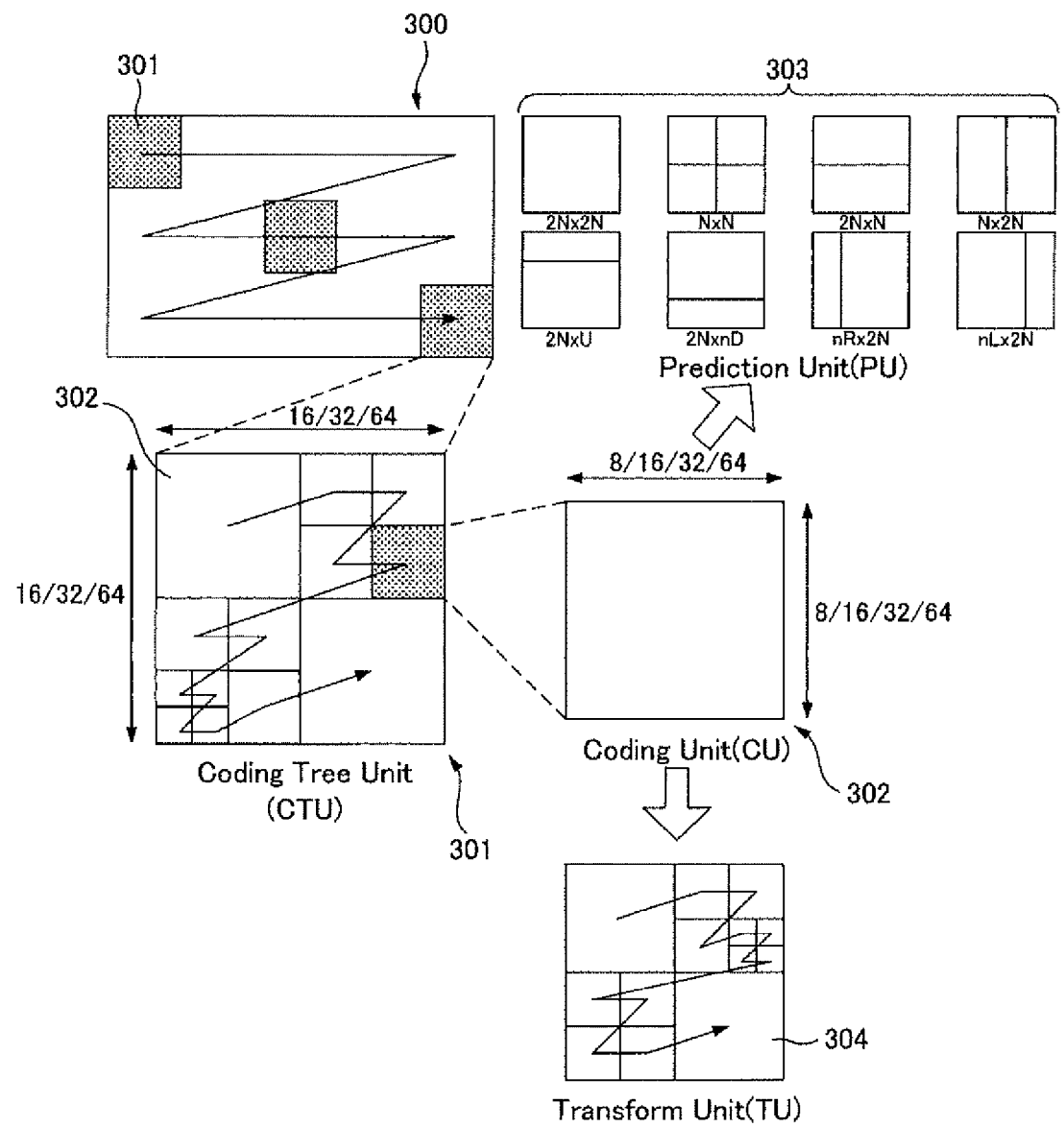
FIG. 3 illustrates an example of the division of a picture in HEVC.

FIG. 3 illustrates an example of the division of a picture in HEVC. As illustrated in FIG. 3, a picture 300 is divided in units of Coding Tree Units (CTUs), which are units for performing an encoding process, and each CTU 301 is encoded in the order of a raster scan. A size can be selected from a range of 64×64 pixels to 16×16 pixels as the size of the CTU 301.

The CTU 301 is further divided into a plurality of Coding Units (CUs) 302 in a quadtree structure. Each CU 302 in a CTU 301 is encoded in the order of a Z scan. The CU 302 has a variable size, and the size is selected from a range of 8×8 pixels to 64×64 pixels of a CU division mode. The CU 302 serves as a unit for selecting the intra-prediction coding method and the inter-prediction coding method as an encoding mode.

CUs 302 are separately processed in units of Prediction Units (PUs) 303 or in units of Transform Units (TUs) 304. The PU 303 serves as a unit for generating a prediction block, for which prediction is conducted in accordance with an encoding mode. For example, the PU 303 in the intra-prediction coding method serves as a unit to which a prediction mode is applied, the prediction mode defining the method of generating a pixel and a prediction block that are referred to for generating the prediction block. In the inter-prediction coding method, meanwhile, the PU 303 serves as a unit for performing motion compensation. The size of the PU 303 can be selected from among 2N×2N, N×N, 2N×N, N×2N, 2N×U, 2N×nD, nR×2N, and nL×2N (N is a half of the CU size) when for example the inter-prediction coding method is applied. The TU 304 serves as a unit for performing an orthogonal transform, and an orthogonal transform is performed for each TU. The size of the TU 304 is selected from a range of 4×4 pixels to 32×32 pixels. The TU 304 is divided in a quadtree structure, and is processed in the order of a Z scan. Note that a CU and a PU are examples of a coding-target block.

The video coding device 1 encodes the CTUs of a coding-target picture in the order of a raster scan. Hereinafter, each constituent of the video coding device 1 will be explained by using an example of a process for one CTU.

For a luminance component, when the coding-target picture including a coding-target CTU is a P picture or a B picture, to which the inter-prediction coding method can be applied, the motion searching circuit 11 calculates a motion vector for each PU that is applicable to the coding-target CTU. Note that the luminance component is an example of a first component. Also, the type of a coding-target picture is determined on the basis of for example the structure of Group of Pictures (GOP) that a control circuit (not illustrated) applies to video data of the coding target and the position in GOP in the coding-target picture.

The motion searching circuit 11 performs block matching on a region that can be referred to for each of one or more local-decoded pictures for a PU of interest in the coding-target CTU, and identifies a reference block that is identical to the PU of interest to the highest degree. Then, the motion searching circuit 11 calculates a vector representing the movement amount between the PU of interest and the reference block as a motion vector. Note that the motion searching circuit 11 generates motion vectors for both L0 prediction and L1 prediction when the coding-target picture is a B picture. The motion searching circuit 11 stores, in the memory 16, the motion vector of each PU and information representing the local-decoded picture referred to by that motion vector, and reports them to the encoding-mode determination circuit 12.

For the luminance component, the encoding-mode determination circuit 12 determines division modes for a CU, a PU and a TU by which the coding-target CTU is divided, and also determines an encoding mode that is applied to each CU. The encoding-mode determination circuit 12 determines encoding modes that can be applied to a coding-target CTU on the basis of for example information representing the type of a coding-target picture included in that coding-target CTU obtained from a control circuit (not illustrated). The encoding-mode determination circuit 12 then selects an encoding mode that is to be actually employed, from among the encoding modes that can be applied. When the type of the coding-target picture is I picture, to which the intra-prediction coding method can only be applied, the encoding-mode determination circuit 12 selects the intra-prediction coding method as an encoding mode to be applied. When the type of the coding-target picture is P picture or B picture, the encoding-mode determination circuit 12 selects for example either the inter-prediction coding method or the intra-prediction coding method as an encoding mode to be applied.

The encoding-mode determination circuit 12 calculates an encoding cost for each CU, the encoding cost being an evaluation value of the amount of encoded data of the coding-target CTU in an applicable encoding mode. For the inter-prediction coding method for example, the encoding-mode determination circuit 12 calculates an encoding cost for each combination of a CU division mode of dividing a CTU, a PU division mode, and a vector mode of defining a method of generating a prediction vector of a motion vector. The encoding-mode determination circuit 12 may use for example either the Adaptive Motion Vector Prediction (AMVP) mode or the merge mode as a vector mode.

For the intra-prediction coding method, the encoding-mode determination circuit 12 calculates an encoding cost for each combination of a CU division mode of dividing a CTU, a PU division mode, and a prediction mode defining the referring direction in a picture.

To calculate an encoding cost, the encoding-mode determination circuit 12 calculates for example a prediction error, i.e., the sum of absolute difference (SAD) for a pixel, in accordance with the following expression for a PU of interest.

$$SAD = \Sigma |OrgPixel - PredPixel|$$

In the above expression, OrgPixel is the value of a pixel included in the PU of interest, and PredPixel is the value of a pixel included in a prediction block that corresponds to the block of interest and that is generated in accordance with the encoding mode for which the encoding cost is calculated.

The encoding-mode determination circuit 12 then uses for example the following expression to calculate encoding cost Cost of the CU of interest.

$$Cost = \Sigma SAD + \lambda * B$$

In the above expression, ΣSAD is the total of SAD calculated for each PU that is included in the CU of interest. Also, B is an estimate value of a code amount for items other than a prediction error, such as for example a motion vector or a flag representing a prediction mode. λ is a Lagrange multiplier.

The encoding-mode determination circuit 12 may calculate, instead of the SAD, the sum of absolute transformed differences (SATD) of Hadamard coefficient of each pixel after the difference image between the PU of interest and the prediction block undergoes a Hadamard Transform.

The encoding-mode determination circuit 12 sets CUs of interest in the coding-target CTU in for example descending order of size that can be selected as a CU size. The encoding-mode determination circuit 12 then selects a prediction mode that results in the minimum cost for each PU division mode in the CU of interest for the intra-prediction coding method. The encoding-mode determination circuit 12 also selects a vector mode that results in the minimum cost for each PU division mode in the CU of interest for the inter-prediction coding method. The encoding-mode determination circuit 12 further selects, for each group of CUs of the same size, an encoding mode that results in the smaller encoding cost between the intra-prediction coding method and the inter-prediction coding method, as an encoding mode applied to the CUs.

Further, the encoding-mode determination circuit 12 performs a similar process on a next CU of interest to calculate the minimum encoding cost, the next CU of interest being each of the four CUs obtained by dividing the CU of interest into four. When the total of the minimum encoding costs calculated for the four divisional CUs is smaller than the minimum encoding cost for the CU of interest, the encoding-mode determination circuit 12 divides the CU of interest into four. The encoding-mode determination circuit 12 repeats the above process until when the division will not occur for any CU, and thereby determines a CU division mode and a PU division mode to be applied to the coding-target CTU.

Further, the encoding-mode determination circuit 12 determines a TU division mode for each CU that is in accordance with the CU division mode determined in the above manner. In this determination, the encoding-mode determination circuit 12 calculates RD cost Cost for each applicable TU division mode by using the following expression.

$$Cost = \sum_i (org(i) - ldec(i))^2 + \lambda \cdot bit \quad (1)$$

In the above expression, org(i) is the value of a pixel included in the CU of interest, and ldec(i) is the value of a decoded pixel, which is a result of encoding that CU of interest in the TU division mode of interest and decoding the encoded CU. Also, bit is a code amount for encoding that CU in the TU division mode of interest. In expression (1), the first term in the right member is encoding distortion and the second term in the right member is a code amount. This leads to an optimum balance between the encoding distortion and the code amount in the TU division mode that results in the minimum RD cost.

In this situation, the encoding-mode determination circuit 12 selects a TU division mode that results in the minimum RD cost Cost.

The encoding-mode determination circuit 12 reports, to the prediction-block generation circuit 13, a combination of the division modes and the encoding modes for CUs and PUs selected for the coding-target CTU, and also reports the TU division modes to the predictive encoder 14. The encoding-mode determination circuit 12 also stores, in the memory 16, the combination of the division modes and the encoding modes for CUs, PUs, and TUs selected for the coding-target CTU.

For the luminance component and each color-difference component, the prediction-block generation circuit 13 generates a prediction block for each PU in accordance with the combination of division modes and encoding modes of CUs and PUs selected for the coding-target CTU. The prediction-block generation circuit 13 then delivers the generated prediction block to the predictive encoder 14.

The prediction-block generation circuit 13 will be explained later in detail.

The predictive encoder 14 predictively encodes the coding-target CTU for the luminance component and each of the two color-difference components. The predictive encoder 14 just performs the same process on the luminance component and each of the two color-difference components, and accordingly the process performed on the luminance component will hereinafter be explained.

The predictive encoder 14 performs a difference operation between each pixel in the coding-target CTU and the corresponding pixel in the prediction block. The predictive encoder 14 determines the difference value, that is obtained through the difference operation and that corresponds to each pixel in each TU in the coding-target CTU, to be the prediction-error signal of each pixel of that TU.

For each PU that is to receive inter-prediction coding, the predictive encoder 14 further generates a list of candidates for the prediction vector of that PU in accordance with a vector mode determined to be applied by the encoding-mode determination circuit 12. The predictive encoder 14 calculates a prediction-error signal between the motion vector of that PU and each candidate for the prediction vector. For each PU that is to receive inter-prediction coding, the predictive encoder 14 determines a prediction vector from among the respective prediction vectors on the basis of the prediction-error signal calculated for each candidate for the prediction vector. The predictive encoder 14 then delivers to the entropy encoder 17, for the motion vector of each PU, information for identifying the prediction vector from the list of the candidates for the prediction vector, the prediction-error signal between the motion vector and the prediction vector, and other information.

For each TU in the coding-target CTU, the predictive encoder 14 also orthogonally transforms the prediction-error signal of that TU so as to obtain the orthogonal-transform coefficients representing the horizontal and vertical frequency components of the prediction-error signal. For example, the predictive encoder 14 performs a Discrete Cosine Transform (DCT) as an orthogonal transform process on the prediction-error signal, and thereby obtains a set of DCT coefficients as orthogonal-transform coefficients.

In the coding-target CTU, the predictive encoder 14 quantizes the orthogonal-transform coefficient of each TU in accordance with quantization parameters including a qp value, which specifies the quantization width, and thereby calculates a quantized orthogonal-transform coefficient. Note hereinafter that a quantized orthogonal-transform coefficient will sometimes be referred to simply as a quantization coefficient.

The predictive encoder 14 outputs the quantized orthogonal-transform coefficient to the decoder 15 and the entropy encoder 17.

For the luminance component and each of the two color-difference components, the decoder 15 further generates, from the quantization coefficient of each TU in the coding-target CTU, a local-decoded block that is referred to for encoding a CU etc. subsequent to that TU, and stores the local-decoded block in the memory 16. The decoder 15 just performs the same process on the luminance component and each of the two color-difference components, and accordingly the process performed on the luminance component will be explained hereinafter.

The decoder 15 inversely quantizes the quantization coefficient that was quantized for each TU, and thereby restores the orthogonal-transform coefficient before the quantization. For example, the decoder 15 performs, for each TU, an inverse orthogonal transform on the restored orthogonal-transform coefficient. For example, when the predictive encoder 14 employs a DCT as an orthogonal transform, the decoder 15 performs an inverse DCT process as an inverse orthogonal transform. Thereby, the decoder 15 restores, for each TU, a prediction-error signal having information at a level similar to that of the prediction-error signal before being encoded.

For each TU, the decoder 15 adds the restored prediction-error signal to the value of each pixel of the prediction block of that TU, and thereby generates a local-decoded block.

Each time the decoder 15 generates a local-decoded block, the decoder 15 stores that local-decoded block in the memory 16. For a PU to which a bidirectional prediction mode has been applied, the decoder 15 further stores, in the memory 16, the prediction-error signal restored for the luminance component.

The decoder 15 also writes a local-decoded picture in the memory 16, the local-decoded picture being obtained by connecting local-decoded blocks for one picture in the order of the encoding of the CTUs.

The memory 16 temporarily stores the local-decoded block received from the decoder 15 for the luminance component and each color-difference component. The memory 16 supplies a local-decoded picture or a local-decoded block to the encoding-mode determination circuit 12 and the prediction-block generation circuit 13. Note that the memory 16 stores a prescribed number of local-decoded pictures that may be referred to by a coding-target picture, and, when the number of such local-decoded pictures exceeds the prescribed number, discards them starting from the oldest in the order of the encoding.

Further, the memory 16 stores the motion vector of each local-decoded block that has received inter-prediction coding. The memory 16 further stores a combination of division modes and the encoding modes for CUs, PUs, and TUs selected for each CTU. For a PU to which a bidirectional prediction mode has been applied, the memory 16 further stores a prediction-error signal for the luminance component.

The entropy encoder 17 is an example of an adding circuit, and entropy encodes the quantization coefficient of each TU in the coding-target CTU, various types of syntax, etc. for the luminance component and each of the two color-difference components. The entropy encoder 17 also entropy encodes information for identifying the prediction vector from among the listed candidates for the prediction vector or other information for each PU that is to receive inter-predicting coding. As will be explained, syntax includes an error threshold used for determining whether a block involves both a bidirectional prediction mode and a unidirectional prediction mode, and the syntax also includes information representing the prediction direction of a partial region to which a unidirectional prediction mode is applied in a PU to which a bidirectional prediction mode is applied.

As an entropy coding method, the entropy encoder 17 in the present embodiment employs an arithmetic coding process such as Context-based Adaptive Binary Arithmetic Coding (CABAC). The entropy encoder 17 outputs a bitstream obtained through entropy coding.

Combining, in a prescribed order, the bitstreams of the CTUs output from the entropy encoder 17 and adding header information etc. defined by HEVC results in an encoded bitstream that includes encoded video data. The video coding device 1 stores the encoded bitstream in a storage device (not illustrated) such as for example a magnetic recording medium, an optical recording medium, and a semiconductor memory, or outputs the encoded bitstream to a different device.

Hereinafter, the prediction-block generation circuit 13 will be explained in detail.

Figure 4:
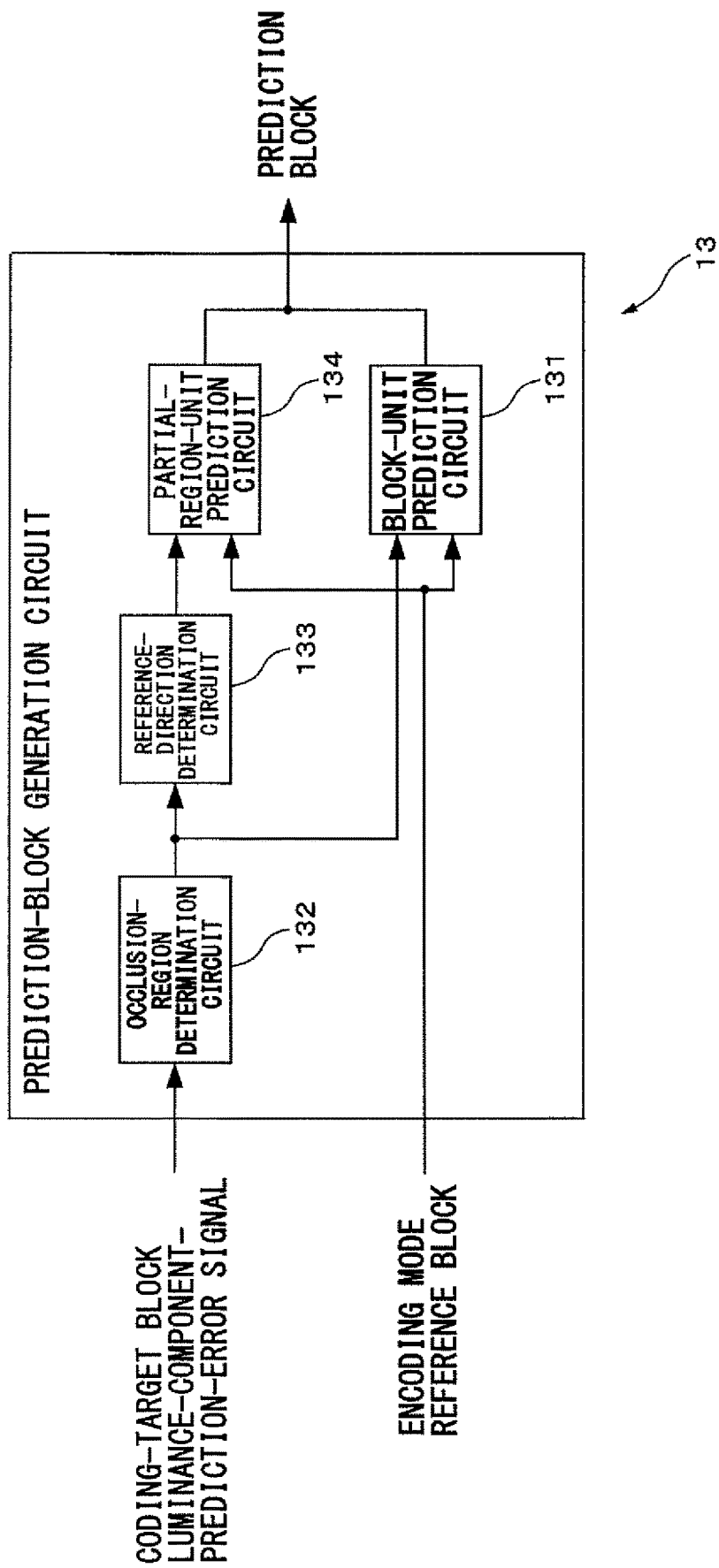
FIG. 4 is a block diagram of a prediction-block generation circuit.

FIG. 4 is a block diagram of the prediction-block generation circuit 13. The prediction-block generation circuit 13 includes a block-unit prediction circuit 131, an occlusion-region determination circuit 132, a reference-direction determination circuit 133, and a partial-region-unit prediction circuit 134.

The block-unit prediction circuit 131 generates a prediction block in accordance with the luminance component of each PU in the coding-target CTU and in accordance with the encoding mode applied to each PU other than a PU involving both a bidirectional prediction mode and a unidirectional prediction mode.

When a PU of interest receives intra-prediction coding for example, the block-unit prediction circuit 131 generates a prediction block on the basis of the value of a pixel in a local-decoded block around that PU that is referred to in the prediction mode selected for that PU.

When the PU of interest is to receive inter-prediction coding, the block-unit prediction circuit 131 generates a prediction block by performing motion compensation for a local-decoded picture that was read from the memory 16 and that is referred to for that PU, on the basis of a motion vector calculated for that PU.

The occlusion-region determination circuit 132 is an example of a region determination circuit of the video coding device 1. For a PU in the coding-target CTU, to which the encoding-mode determination circuit 12 determined to apply a bidirectional prediction mode for the luminance component, the occlusion-region determination circuit 132 determines a partial region that is to receive the application of a unidirectional prediction mode for each color-difference component. Each color-difference component is an example of a second component.

Reference is again made to FIG. 1, in which each pixel influenced by the obstacle 110 has a greater value of the prediction-error signal for the luminance component. Also, because a pixel in the picture of the luminance component and the corresponding pixel in the picture of each color-difference component includes the same subject, it is believed that the luminance component and the two color-difference components have correlation. This leads to an assumption, also for each color-difference component, that generating a prediction block by applying a bidirectional prediction mode will result in a greater value of the prediction-error signal of each pixel influenced by the obstacle 110. Accordingly, it is desirable that a partial region that is a group of pixels influenced by the obstacle 110 receive the application of a unidirectional prediction mode in such a manner that a prediction block is generated without reference to a picture including the obstacle 110.

The occlusion-region determination circuit 132 thus compares, for each pixel included in a PU to which a bidirectional prediction mode has been applied, the absolute value of a prediction-error signal restored for the corresponding pixel of the prediction block for the luminance component with a prescribed error threshold that is for determining whether a unidirectional prediction mode is to be applied. Note that a prediction block for a luminance component is generated in a bidirectional prediction mode on the basis of a first reference picture, which has been encoded and exists in the L0 direction with respect to the coding-target picture, and a second reference picture, which has been encoded and exists in the L1 direction with respect to the coding-target picture. The occlusion-region determination circuit 132 also reads, from the memory 16, a prediction-error signal restored for the luminance component of each pixel included in the PU to which a bidirectional prediction mode has been applied. The occlusion-region determination circuit 132 then extracts a pixel for which the absolute value of the prediction-error signal is greater than or equal to the error threshold, and determines to apply a unidirectional prediction mode to a partial region that is a group of the extracted pixels.

A PU including a partial region to which a unidirectional prediction mode is applied may hereinafter be referred to as an occlusion PU for the sake of convenience of the explanations. Also, a partial region to which a unidirectional prediction mode is to be applied may be referred to as an occlusion region.

Also, an identical value is set in advance as a prescribed error threshold for, for example, the video coding device 1 and the video decoding device. An alternative configuration may be employed in which a prescribed error threshold is set by the video coding device 1 and information representing the set error threshold is included in an encoded bitstream of video data. In that case, the information representing the set error threshold may be included in for example high-level syntax such as Sequence Parameter Set (SPS) or Picture Parameter Set (PPS) in HEVC, or may be included in syntax of a CU or a PU. The information representing the set error threshold is then entropy encoded by the entropy encoder 17, and is included in the encoded bitstream.

The occlusion-region determination circuit 132 reports to the reference-direction determination circuit 133, a PU having an occlusion region from among PUs to which a bidirectional prediction mode is to be applied. The occlusion-region determination circuit 132 also reports to the block-unit prediction circuit 131, a PU not including an occlusion region from among PUs to which a bidirectional prediction mode is to be applied.

The reference-direction determination circuit 133 determines, for each color-difference component, a prediction direction in which reference is made in an occlusion region from between the L0 and L1 directions. For example, the reference-direction determination circuit 133 generates, for a color-difference component of interest, an L0-prediction block by using the motion vector in the L0 direction and generates an L1-prediction block by using the motion vector in the L1 direction, the motion vectors being vectors for the PU of interest determined on the basis of the luminance component. The reference-direction determination circuit 133 then calculates, for each of the L0-prediction block and the L1-prediction block, the absolute value of a difference of a color-difference component of interest for each pixel corresponding between an occlusion region and the corresponding partial region in the prediction block, and calculates the sum of the absolute values. For a color-difference component of interest, the reference-direction determination circuit 133 determines to be a prediction direction in which reference is made for the occlusion region, the prediction direction having the smaller sum of the absolute values between the L0 and L1 directions.

The reference-direction determination circuit 133 reports an occlusion region included in a PU to which a bidirectional prediction mode has been applied and information representing the prediction direction for the occlusion region, to the partial-region-unit prediction circuit 134 and the entropy encoder 17. Note that the information representing a prediction direction for an occlusion region can be for example a 1-bit flag (which for example represents the L0 direction with "0" and the L1 direction with "1").

For each color-difference component, the partial-region-unit prediction circuit 134 generates a prediction block by using both a bidirectional prediction mode and a unidirectional prediction mode for the occlusion PU.

For an occlusion region in an occlusion PU, the partial-region-unit prediction circuit 134 for example generates a prediction block by using the motion vector of a prediction direction in which reference is made from among the motion vectors in the directions obtained for the luminance component. For a region that is not an occlusion region in the occlusion PU meanwhile, the partial-region-unit prediction circuit 134 generates a prediction block in accordance with a bidirectional prediction mode by using the motion vectors in the L0 and L1 directions obtained for the luminance component. Thereby, a prediction block is generated with reference to the reference picture not including an obstacle for the occlusion region in the occlusion PU, and a prediction block is generated with reference to two reference pictures for a different region in the occlusion PU. This results in an appropriate prediction block with a smaller prediction error for the entire occlusion PU.

Figure 5:
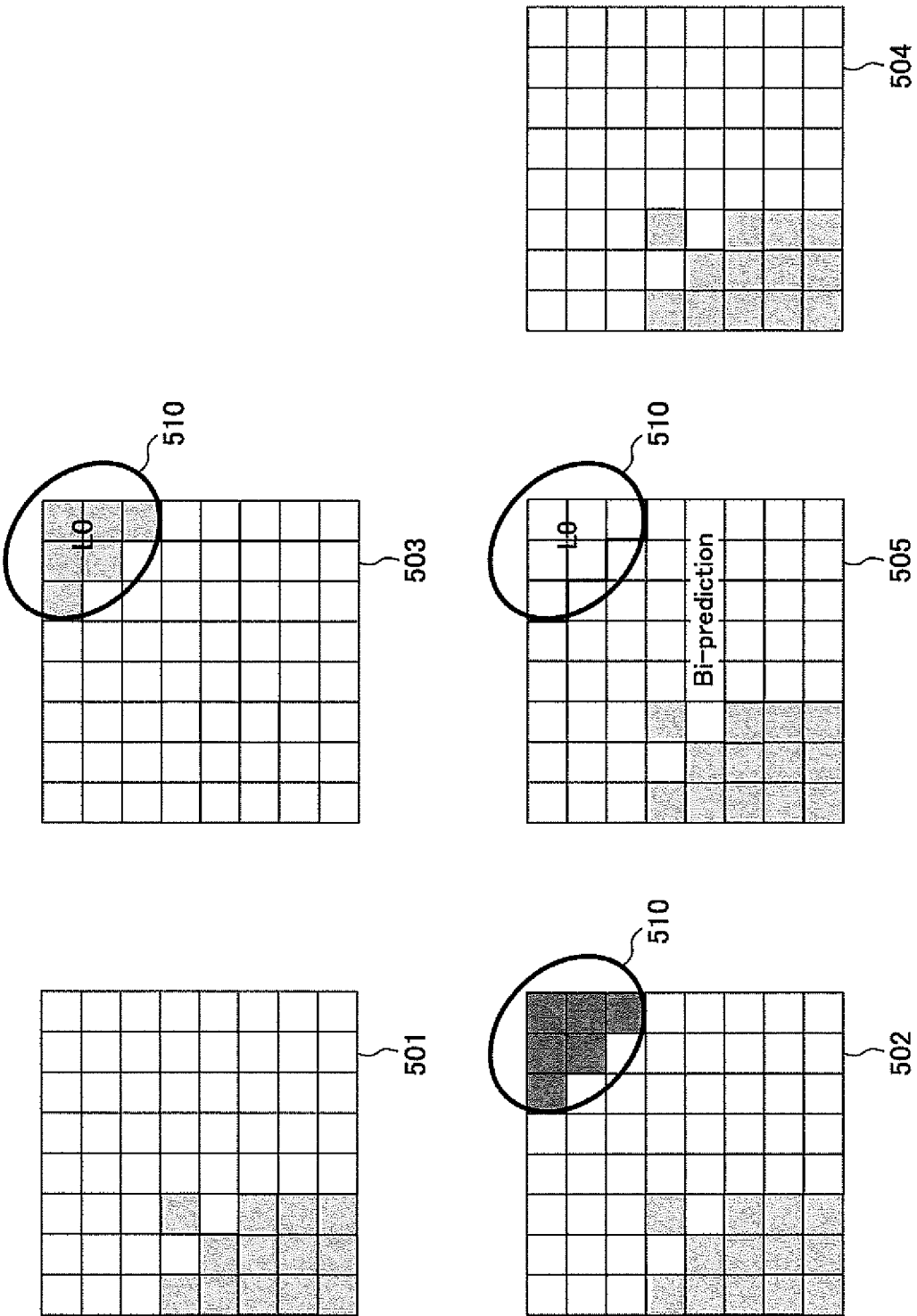
FIG. 5 illustrates examples of an L0-prediction block, an L1-prediction block, and a prediction block for an occlusion PU.

FIG. 5 illustrates examples of an L0-prediction block, an L1-prediction block, and a prediction block for an occlusion PU. In this example, of an L0-prediction block 501 and an L1-prediction block 502, which are serving as reference blocks, the L1-prediction block 502 includes a region 510 that includes an obstacle in the upper right portion of the L1-prediction block 502. As a result, each pixel has a greater value of a prediction-error signal in the region 510 also in a difference image 503, which represents the absolute values of differences between the corresponding pixels belonging to an occlusion PU and a prediction block generated in a bidirectional prediction mode, and accordingly the region 510 becomes an occlusion region. Also, in the occlusion region 510, the L0-prediction block 501 resembles a coding-target block (a PU for example) 504 more than the L1-prediction block 502, and thus a unidirectional prediction mode using the L0-prediction block is applied to the occlusion region 510. Meanwhile, a bidirectional prediction mode is applied to a region that is not the occlusion region 510. This removes the influence of the obstacle also in the occlusion region 510 in the prediction block 505 for the color-difference components, resulting in the entire prediction block 505 having a smaller prediction error with respect to the coding-target block 504.

Also, when the occlusion region 510 in the coding-target block 504 includes an obstacle, a unidirectional prediction mode using an L1-prediction block for the occlusion region 510 is applied. Accordingly, a prediction block having a smaller prediction error for the coding-target block 504 than when a bidirectional prediction mode is applied to the entire prediction block is generated in this case as well.

For each of the two color-difference components, the partial-region-unit prediction circuit 134 delivers to the predictive encoder 14, a prediction block generated for each PU included in the coding-target CTU.

Figure 6B:
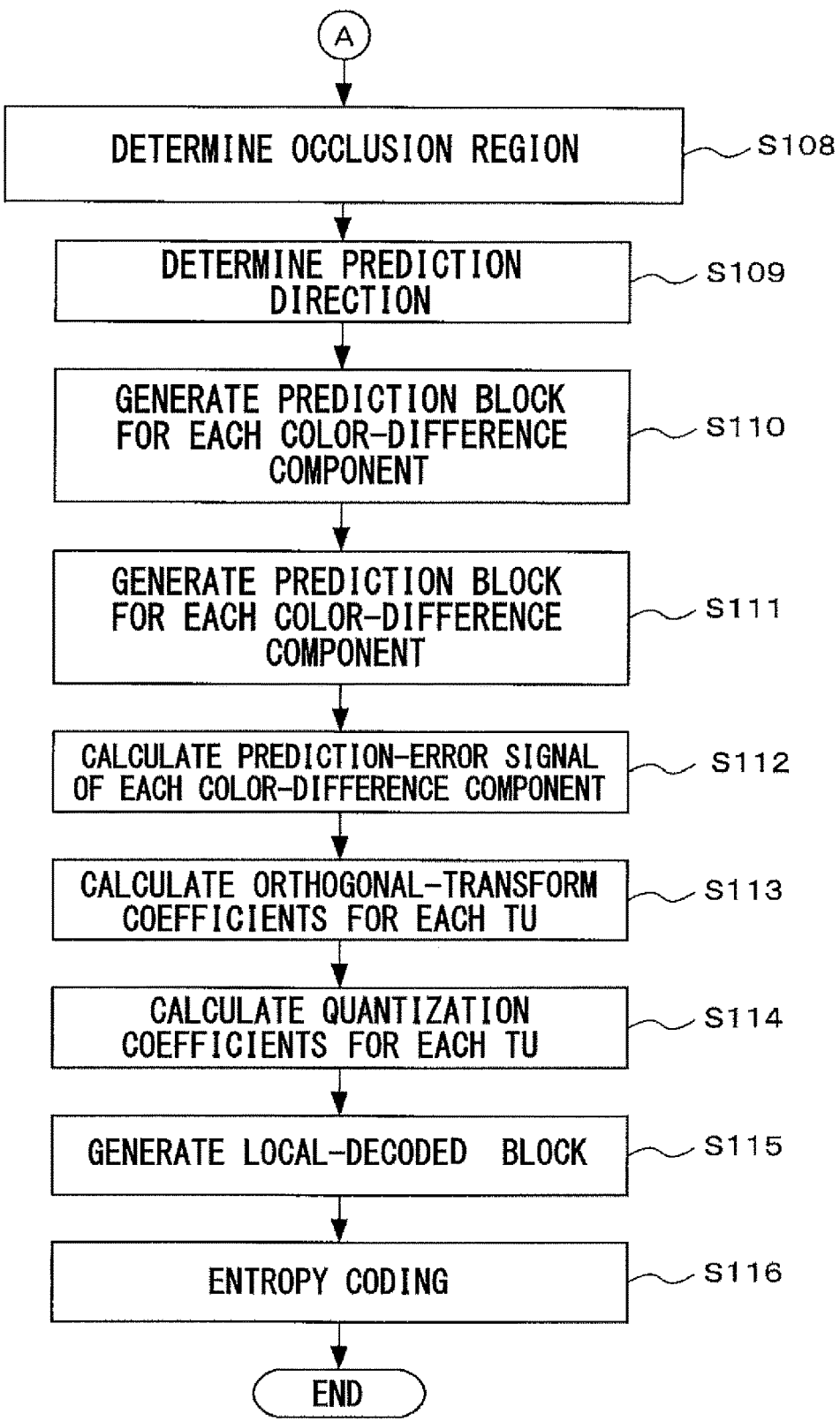
FIG. 6B illustrates a second part of an operation flowchart for a video coding process.

FIG. 6A and FIG. 6B illustrate operation flowcharts for a video coding process executed by the video coding device 1. The video coding device 1 executes a video coding process for each CTU in accordance with the operation flowcharts explained below.

The motion searching circuit 11 calculates a motion vector for each PU to which the inter-prediction coding method can be applied in the coding-target CTU for a luminance component (step S101). The motion searching circuit 11 then reports the motion vector of each PU to the encoding-mode determination circuit 12. When the coding-target picture included in the coding-target CTU is a B picture, the motion searching circuit 11 calculates a motion vector each for the L0 direction and the L1 direction. When the coding-target picture is an I picture, the process in step S101 may be omitted.

On the basis of the luminance component, the encoding-mode determination circuit 12 determines a division mode and an encoding mode for each of a CU, a PU, and a TU in a coding-target CTU (step S102). The encoding-mode determination circuit 12 reports the division modes and the encoding modes for a CU and a PU to the prediction-block generation circuit 13, and also reports the TU division mode to the predictive encoder 14. Also, the encoding-mode determination circuit 12 stores, in the memory 16, the division modes and the encoding modes for a CU, PU, and a TU.

For the luminance component, the block-unit prediction circuit 131 of the prediction-block generation circuit 13 generates a prediction block in accordance with division modes and encoding modes for a CU and a PU that were determined (step S103). Also, the prediction-block generation circuit 13 delivers the generated prediction block to the predictive encoder 14.

For the luminance component, the predictive encoder 14 calculates a prediction-error signal between the corresponding pixels belonging to the coding-target CTU and the prediction block (step S104). The predictive encoder 14 then orthogonally transforms the prediction-error signals of the pixels for each TU for the luminance component, and thereby calculates the orthogonal-transform coefficients for each TU (step S105). The predictive encoder 14 further quantizes the orthogonal-transform coefficients of each TU in the coding-target CTU for the luminance component, and calculates the quantization coefficients (step S106). The predictive encoder 14 then outputs the quantization coefficients of each TU to the decoder 15 and the entropy encoder 17.

For the luminance component, the decoder 15 restores prediction-error signals from the quantization coefficients of each TU in the coding-target CTU, and generates a local-decoded block corresponding to that CTU on the basis of the restored prediction-error signals (step S107). The decoder 15 then stores the local-decoded block in the memory 16.

For a PU to which a bidirectional prediction mode is applied, the occlusion-region determination circuit 132 of the prediction-block generation circuit 13 determines to be an occlusion region, a group of pixels for which the absolute value of the prediction-error signal restored for the luminance component is greater than or equal to a prescribed error threshold (step S108). The reference-direction determination circuit 133 of the prediction-block generation circuit 13 then determines a prediction direction in which reference is made for the occlusion region (step S109).

For a PU to which a bidirectional prediction mode is not applied and for a PU to which a bidirectional prediction mode is applied and which does not include an occlusion region, the block-unit prediction circuit 131 generates prediction blocks of each color-difference component in units of PU (step S110). Meanwhile, the partial-region-unit prediction circuit 134 generates, for an occlusion PU, a prediction block of each color-difference component by applying a unidirectional prediction mode to an occlusion region and applying a bidirectional prediction mode to a region that is not an occlusion region (step S111).

For each color-difference component, the predictive encoder 14 calculates a prediction-error signal between the corresponding pixels belonging to the coding-target CTU and the prediction block (step S112). For each color-difference component, the predictive encoder 14 also orthogonally transforms the prediction-error signals of pixels for each TU, and thereby calculates the orthogonal-transform coefficients of each TU (step S113). The predictive encoder 14 further quantizes the orthogonal-transform coefficients of each TU in the coding-target CTU for each color-difference component, and calculates the quantization coefficients (step S114). The predictive encoder 14 then outputs the quantization coefficients of each TU to the decoder 15 and the entropy encoder 17.

The decoder 15 generates, from the quantization coefficients of each TU in the coding-target CTU, a local-decoded block corresponding to that CTU for each color-difference component (step S115). The decoder 15 then stores the local-decoded block in the memory 16.

For the luminance component and each color-difference component, the entropy encoder 17 entropy encodes the quantization coefficients, various types of syntax, etc. (step S116). The various types of syntax include syntax representing a prediction direction of an occlusion region and syntax representing an error threshold used for determining an occlusion region for a PU including an occlusion region. The entropy encoder 17 outputs the obtained encoded bitstream. The video coding device 1 then terminates the video coding process for one CTU.

As described above, the video coding device identifies, as an occlusion region, a group of pixels for which the absolute value of the prediction-error signal of the luminance component is greater than or equal to an error threshold for a coding-target block to which a bidirectional prediction mode is applied. The video coding device then generates, for each color-difference component, a prediction block by applying a unidirectional prediction mode to an occlusion region in a coding-target block. As described above, the video coding device makes it possible to generate, for each color-difference component, a prediction block while switching between a bidirectional prediction mode and a unidirectional prediction mode for each partial region also for a coding-target block to which a bidirectional prediction mode is applied for the luminance component. This enables the video coding device to increase the accuracy of a prediction block for a coding-target block even when a subject exists that is included in only one of the L0-prediction block and the L1-prediction block. Thereby, the video coding device can increase the efficiency in encoding video data.

FIG. 7 illustrates a configuration of a video decoding device that decodes video data that has been encoded by the video coding device according to the above embodiment. The video decoding device 2 includes an entropy decoder 21, a prediction-block generation circuit 22, a decoder 23, and a memory 24.

Each of the constituents belonging to the video decoding device 2 is formed as a separate circuit. Alternatively, the constituents belonging to the video decoding device 2 may be mounted on the video decoding device 2 as an integrated circuit in which circuits corresponding to the constituents are integrated. Further, the functions of the constituents belonging to the video decoding device 2 may be implemented by a processor included in the video decoding device 2 executing a computer program.

The video decoding device 2 obtains an encoded bitstream including encoded video data through for example a communication network and an interface circuit for connecting the video decoding device 2 with the communication network. The video decoding device 2 then stores that encoded bitstream in a buffer memory (not illustrated). The video decoding device 2 reads the encoded data from the buffer memory in units of CTU, and inputs that data in units of CTU to the entropy decoder 21.

The entropy decoder 21 entropy decodes the data that has been encoded in units of CTU. The entropy decoder 21 then decodes the quantization coefficients of each TU in the CTU for the luminance component and each color-difference component. The entropy decoder 21 also entropy decodes, for each CU that has received inter-prediction coding, information (such as information representing a vector mode to be applied and the prediction vector of the motion vector or other information) for identifying the motion vector of each PU included in that CU. The entropy decoder 21 further entropy decodes, for each CU that has received intra-prediction coding, the prediction mode of each PU included in that CU. The entropy decoder 21 entropy decodes various types of syntax including information representing the division mode and the encoding mode that were applied, the error threshold used for determining an occlusion region, and a prediction direction in which reference is made for an occlusion region. The entropy decoder 21 also delivers the various types of syntax etc. to the prediction-block generation circuit 22. The entropy decoder 21 also delivers the quantization coefficients to the decoder 23.

For the decoding-target CTU, the prediction-block generation circuit 22 refers to a decoded picture or a decoded region in the decoding-target picture, and generates, for each CU, a prediction block of each PU included in that CU. In doing so, the prediction-block generation circuit 22 performs a process similar to that performed by the prediction-block generation circuit 13 of the video coding device 1 so as to generate a prediction block. The prediction-block generation circuit 22 further reproduces a motion vector as well from the information representing the applied vector mode and the prediction-error signal of the motion vector.

FIG. 8 is a block diagram of the prediction-block generation circuit 22. The prediction-block generation circuit 22 includes an occlusion-region determination circuit 221, a reference-direction determination circuit 222, a partial-region-unit prediction circuit 223, and a block-unit prediction circuit 224.

The occlusion-region determination circuit 221 is an example of a region determination circuit of the video decoding device 2, and performs a process similar to that performed by the occlusion-region determination circuit 132 in the video coding device 1 for each color-difference component so as to determine an occlusion region in a PU to which a bidirectional prediction mode has been applied. Specifically, the occlusion-region determination circuit 221 compares the absolute value of the prediction-error signal of the luminance component of each pixel in a PU generated by the decoder 23 with the entropy-decoded error threshold for a PU to which a bidirectional prediction mode has been applied. The occlusion-region determination circuit 221 then determines to be an occlusion region, a group of pixels for which the absolute value of the prediction-error signal is greater than or equal to the error threshold in the PU of interest. The occlusion-region determination circuit 221 then reports the identified occlusion region to the reference-direction determination circuit 222. The occlusion-region determination circuit 221 also reports to the block-unit prediction circuit 224, a PU which does not include an occlusion region and to which a bidirectional prediction mode is applied.

The reference-direction determination circuit 222 determines a prediction direction in which reference is made for an occlusion region. The reference-direction determination circuit 222 in the present embodiment refers to the entropy-decoded information of the prediction direction in which reference is made for the occlusion region, and thereby determines the prediction direction in which reference is made from between L0 and L1 directions. The reference-direction determination circuit 222 then reports to the partial-region-unit prediction circuit 223, the occlusion region and the prediction direction in which reference is made for the occlusion region.

The partial-region-unit prediction circuit 223 generates a prediction block of each color-difference component for each PU including the occlusion region, similarly to the partial-region-unit prediction circuit 134 in the video coding device 1. Specifically, the partial-region-unit prediction circuit 223 calculates the value of each pixel in the corresponding region in the prediction block in a unidirectional prediction mode for the occlusion region. For this purpose, the partial-region-unit prediction circuit 223 generates the motion vectors respectively of the L0 and L1 directions on the basis of the entropy-decoded information for identifying the motion vectors. The partial-region-unit prediction circuit 223 calculates the value of each pixel of the prediction block on the basis of the reference block, in a decoded reference image, that is indicated by the motion vector of the prediction direction in which reference is made from between the L0 and L1 directions.

For a region that is not an occlusion region in a PU to which a bidirectional prediction mode is applied, the partial-region-unit prediction circuit 223 generates a prediction block in accordance with a bidirectional prediction mode. Specifically, the partial-region-unit prediction circuit 223 generates an L0-prediction block on the basis of a region in a decoded reference picture, which is represented by the L0-directional motion vector, and generates an L1-prediction block on the basis of a region in a decoded reference picture, which is represented by the L1-directional motion vector. The partial-region-unit prediction circuit 223 then calculates the value of each pixel in the prediction block of a region that is not an occlusion region by performing weighted averaging on the values of the corresponding pixels of the L0-prediction block and the L1-prediction block.

For the luminance component of each decoding-target PU and the color-difference component of each PU not including an occlusion region, the block-unit prediction circuit 224 generates a prediction block in accordance with the encoding mode applied to that PU similarly to the block-unit prediction circuit 131 of the video coding device 1. Specifically, the block-unit prediction circuit 224 identifies, in accordance with the entropy-decoded encoding mode, a region that is referred to in a decoded reference picture to generate a prediction block in units of PU on the basis of the identified region.

The prediction-block generation circuit 22 outputs the generated prediction block to the decoder 23.

The decoder 23 inversely quantizes the luminance component and each color-difference component by multiplying a quantization coefficient of each TU received from the entropy decoder 21 by a prescribed number, the prescribed number being equivalent to the quantization width determined by the quantization parameter obtained from decoded header information. This inverse quantization restores the orthogonal-transform coefficients of each TU. Thereafter, the decoder 23 performs an inverse-orthogonal transform process on an orthogonal-transform coefficient for each TU. Performing an inverse quantization process and an inverse-orthogonal transform process on the quantization coefficients of each TU reproduces the prediction-error signal of each pixel of the entire CTU.

The decoder 23 can generate each PU by adding the reproduced prediction-error signal corresponding to each pixel of the prediction block of each PU to the pixel value of that pixel. The decoder 23 then generates the CTU by connecting the generated PUs in the encoding order. The decoder 23 stores the generated CTU as a decoded CTU in the memory 24. The decoder 23 also generates the entire picture by connecting the decoded CTUs in the encoding order. The decoder 23 stores the generated picture as a decoded picture in the memory 24, and also stores the decoded picture in a buffer memory. Each decoded picture stored in the buffer memory is output by a control circuit (not illustrated) to a display device (not illustrated) in the order of being displayed. Further, the decoder 23 outputs the prediction-error signal of the luminance component to the prediction-block generation circuit 22 for a PU to which a bidirectional prediction mode is applied.

For the luminance component and each color-difference component, the memory 24 temporarily stores a decoded CTU and a decoded picture received from the decoder 23. The memory 24 then supplies the CTU as a reference region or the picture as a reference picture to the prediction-block generation circuit 22 for the luminance component and each color-difference component. Note that the memory 24 stores a prescribed number of pictures, and, when the amount of the stored data exceeds the amount equivalent to the prescribed number, discards them starting from the oldest in the encoding order.

Figure 9:
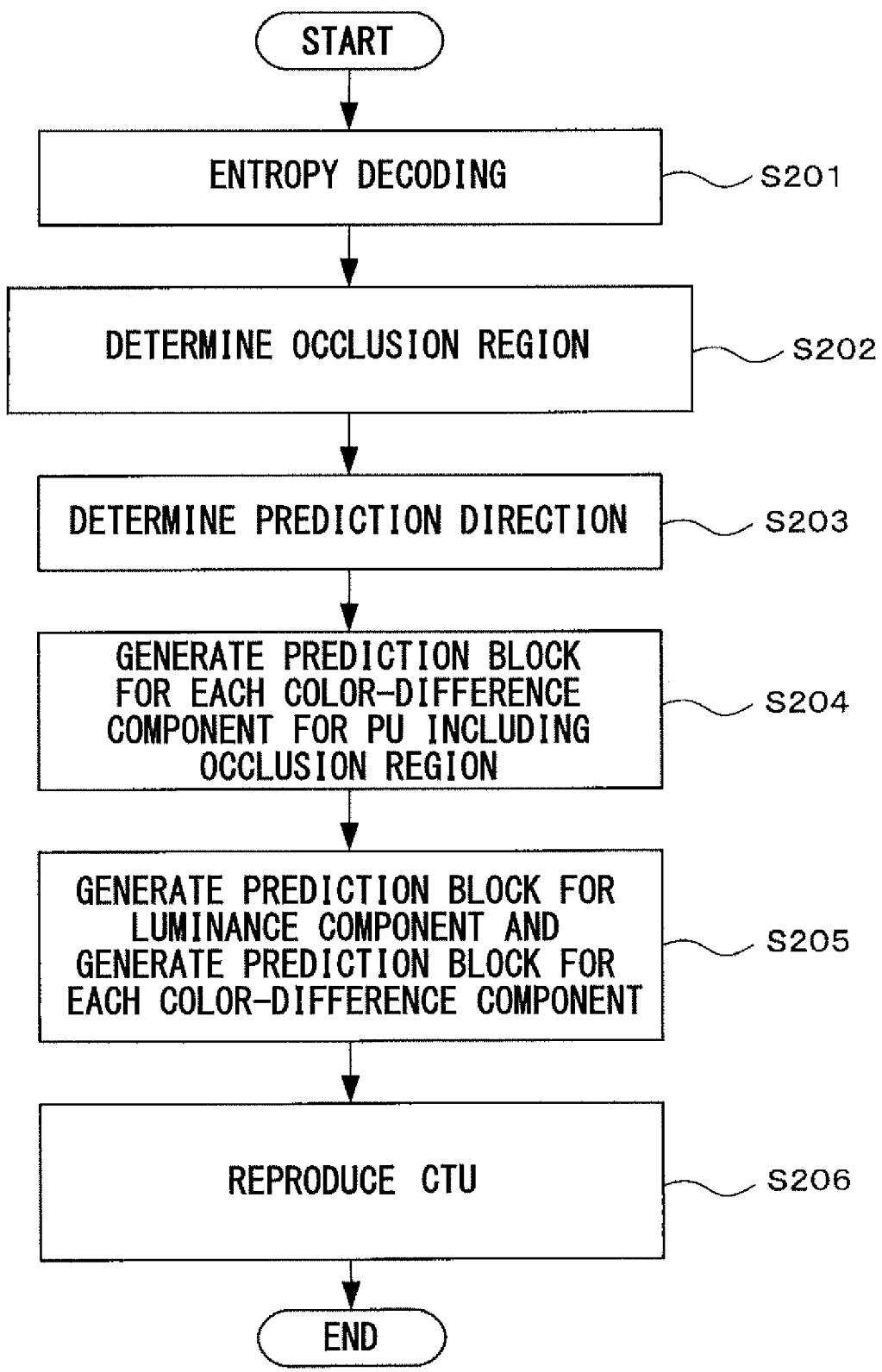
FIG. 9 is an operation flowchart of a video decoding process.

FIG. 9 is an operation flowchart of a video decoding process performed by the video decoding device 2. The video decoding device 2 performs the video decoding process illustrated in FIG. 9 for each decoding-target CTU.

The entropy decoder 21 entropy decodes data that has been encoded in units of CTU. Thereby, the entropy decoder 21 generates various types of syntax, etc. (step S201), the various types of syntax including information representing the quantization coefficients of each TU of a decoding-target CTU for the luminance component and each color-difference component, the error threshold, and the prediction direction of an occlusion region.

Also, the occlusion-region determination circuit 221 of the prediction-block generation circuit 22 compares the absolute value of the reproduced prediction-error signal of the luminance component and the error threshold so as to determine the occlusion region for each PU to which a bidirectional prediction mode has been applied (step S202). The reference-direction determination circuit 222 of the prediction-block generation circuit 22 then refers to the information representing the prediction direction included in the generated syntax for each PU including the occlusion region, and thereby determines the prediction direction in which reference is made for the occlusion region (step S203).

For each PU including the occlusion region, the partial-region-unit prediction circuit 223 applies a unidirectional prediction mode to the occlusion region for each color-difference component and applies a bidirectional prediction mode to a region that is not the occlusion region for each color-difference component, and thereby generates a prediction block (step S204). Meanwhile, the block-unit prediction circuit 224 of the prediction-block generation circuit 22 generates a prediction block for the luminance component of each PU of the decoding-target CTU. For each PU that is not a PU involving both a bidirectional prediction mode and a unidirectional prediction mode, the block-unit prediction circuit 224 further generates a prediction block for each PU in accordance with the encoding mode applied to that PU (step S205).

The decoder 23 inversely quantizes the luminance component and each color-difference component by multiplying a quantization coefficient received from the entropy decoder 21 by a prescribed number, the prescribed number being equivalent to the quantization width determined by the quantization parameter obtained from header information included in the encoded bitstream. The decoder 23 then reproduces the prediction-error signal of the decoding-target CTU by performing an inverse-orthogonal transform process on the orthogonal transform signals in units of TU. Thereafter, the decoder 23 reproduces the CTU by adding the reproduced prediction-error signal corresponding to each pixel of the prediction block to the pixel value of that pixel (step S206). The decoder 23 stores the reproduced CTU in the memory 24. The video decoding device 2 then terminates the video decoding process for the decoding-target CTU.

As described above, the video decoding device can decode encoded video data even when the video coding device of the above embodiment applied both a bidirectional prediction mode and a unidirectional prediction mode to color-difference components of a block including an occlusion region.

Note that the occlusion-region determination circuit 132 of the video coding device and the occlusion-region determination circuit 221 of the video decoding device 2 may divide a PU to which a bidirectional prediction mode is applied into a plurality of subblocks in a variation example. The occlusion-region determination circuit 132 and the occlusion-region determination circuit 221 may also determine whether a PU to which a bidirectional prediction mode is applied is an occlusion region for each subblock. In that case, the occlusion-region determination circuit 132 divides for example a PU of interest into a plurality of subblocks each having a prescribed size (4×4 pixels for example). The occlusion-region determination circuit 132 counts, for each subblock, the number of pixels, included in that subblock, for which the absolute value of the prediction-error signal is greater than or equal to a prescribed error threshold. When the number of pixels for which the absolute value of the prediction-error signal is greater than or equal to the prescribed error threshold is greater than or equal to a prescribed count threshold, the occlusion-region determination circuit 132 determines that subblock to be an occlusion region. Note that the prescribed count threshold is set to be in a range from for example one third to two thirds of the number of pixels included in the subblock.

In such a case, the above count threshold is included in syntax such as SPS or PPS together with the error threshold. The entropy encoder 17 of the video coding device 1 then adds the syntax including the count threshold and the error threshold to the encoded bit stream. In such a case, the occlusion-region determination circuit 221 of the video decoding device 2 as well performs a process similar to that performed by the occlusion-region determination circuit 132, and thereby can identify an occlusion region in units of subblock for each PU to which a bidirectional prediction mode is applied.

Figure 10:
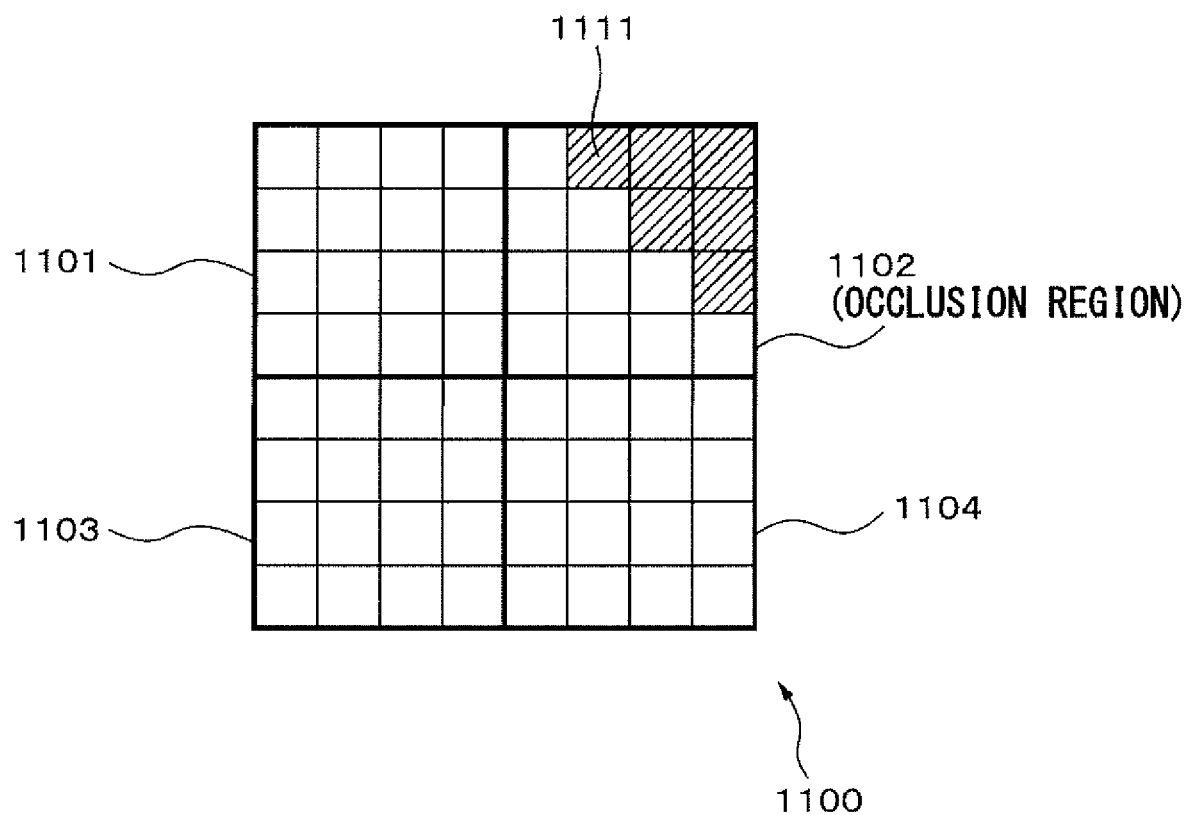
FIG. 10 illustrates an example of an occlusion region determination according to a variation example.

FIG. 10 illustrates an example of an occlusion region determination according to the present variation example. In this example, a PU-of-interest 1100 is divided into four subblocks 1101 through 1104. The upper right subblock 1102 from among the subblocks 1101 through 1104 includes a plurality of pixels 1111 for which the absolute value of the prediction-error signal is greater than or equal to the error threshold. The other subblocks do not include a pixel for which the absolute value of the prediction-error signal is greater than or equal to the error threshold. Because the number of the pixels 1111 is greater than or equal to the count threshold, subblock 1102 is determined to be an occlusion region.

According to the present variation example, the video coding device and the video decoding device can appropriately determine an occlusion region.

According to another variation example, the occlusion-region determination circuit 132 of the video coding device may only divide a PU having a smallest size that allows the application of a bidirectional prediction mode into subblocks to determine whether each of the subblocks is an occlusion region. For example, the smallest PU size that allows the application of a bidirectional prediction mode is 8×8 pixels according to HEVC. Accordingly, the occlusion-region determination circuit 132 divides, into subblocks, only a PU of 8×8 pixels in size from among PUs to which a bidirectional prediction mode has been applied, and determines whether each of the subblocks is an occlusion region.

The reason is as follows. A PU not having the smallest size that allows the application of a bidirectional prediction mode can further be divided. This means that when part of a PU includes an occlusion region, a PU division mode that will result in smaller sized PUs is assumed to be determined in the determination of the encoding mode. However, because a PU division mode that will result in smaller sized PUs was not determined, the occlusion region is assumed to be smaller than the smallest PU size that allows the application of a bidirectional prediction mode. Note that when an occlusion region occupies a large portion of a PU, a unidirectional prediction mode instead of a bidirectional prediction mode is assumed to be applied to that PU in the determination of the encoding mode.

In such a case too, the occlusion-region determination circuit 221 of the video decoding device 2 performs a process similar to that performed by the occlusion-region determination circuit 132 so as to identify an occlusion region in units of subblock for each PU to which a bidirectional prediction mode is applied.

According to the present variation example, an occlusion region determination is performed for limited PUs, leading to the reduction in the amount of operation in the video coding process and the video decoding process.

Note that a configuration is also possible in which the occlusion-region determination circuit 132 of the video coding device 1 generates syntax that explicitly represents an occlusion region instead of including the count threshold and the error threshold in an encoded bitstream. For example, that syntax may include, for each subblock, a one-bit flag indicating whether that subblock is an occlusion region. The entropy encoder 17 of the video coding device 1 may add, to an encoded bitstream, syntax that explicitly represents an occlusion region. In that case, the occlusion-region determination circuit 221 of the video decoding device 2 identifies, for each PU to which a bidirectional prediction mode is applied, an occlusion region by referring to syntax explicitly representing an occlusion region reproduced by the entropy decoder 21. In such a case, the occlusion-region determination circuit 132 may determine an occlusion region by comparing, instead of a restored prediction-error signal, the absolute value of a prediction-error signal calculated by the predictive encoder 14 with an error threshold.

According to the present variation example, the video decoding device 2 can identify an occlusion region without performing a calculation for identifying it, leading to the reduction in the amount of calculations for decoding the encoded video data.

Further, the reference-direction determination circuit 133 of the video coding device 1 in another variation example may determine a prediction direction to be applied to an occlusion region by referring to a prediction direction for a PU that has received inter-prediction coding within a prescribed spatial or temporal range with respect to an occlusion PU.

For example, the reference-direction determination circuit 133 sets, as a PU to refer to, a PU, including an occlusion region, that is adjacent to the PU of interest and that is earlier than the PU of interest in the encoding order (i.e., the PU that is adjacent on the upper or left side). Also, the reference-direction determination circuit 133 may set, as a PU to refer to, any PU that is adjacent to the PU of interest from among PUs included in the coding-target CTU that includes the PU of interest even when the PU is later than the PU of interest in the encoding order. This is because it is also possible to only decode a motion vector beforehand for PUs in the same CTU when the encoded video data is to be decoded.

The reference-direction determination circuit 133 may also set, as a PU to refer to, a ColPU in a picture that is immediately earlier than the coding-target picture including the PU of interest in the encoding order and that has been encoded, the position of the ColPU in the encoded picture corresponding to the position of the PU of interest in the coding-target picture. The reference-direction determination circuit 133 may further set a PU adjacent to the ColPU as a PU to refer to as well.

Alternatively, the reference-direction determination circuit 133 may set, as a PU to refer to, only a PU that is adjacent to an occlusion region from among PUs adjacent to the PU of interest, when an occlusion region is set in units of subblock.

The reference-direction determination circuit 133 selects a PU to which a unidirectional prediction mode has been applied from among the PUs that are referred to. The reference-direction determination circuit 133 then determines the most frequent prediction direction from among the prediction directions of the selected PUs to be a prediction direction that is to be applied to the occlusion region. This is because the portion around an occlusion region may include the same object as that included in the occlusion region and the prediction direction of a PU around the occlusion region is highly likely to indicate a reference picture including the object included in the occlusion region.

Figure 11:
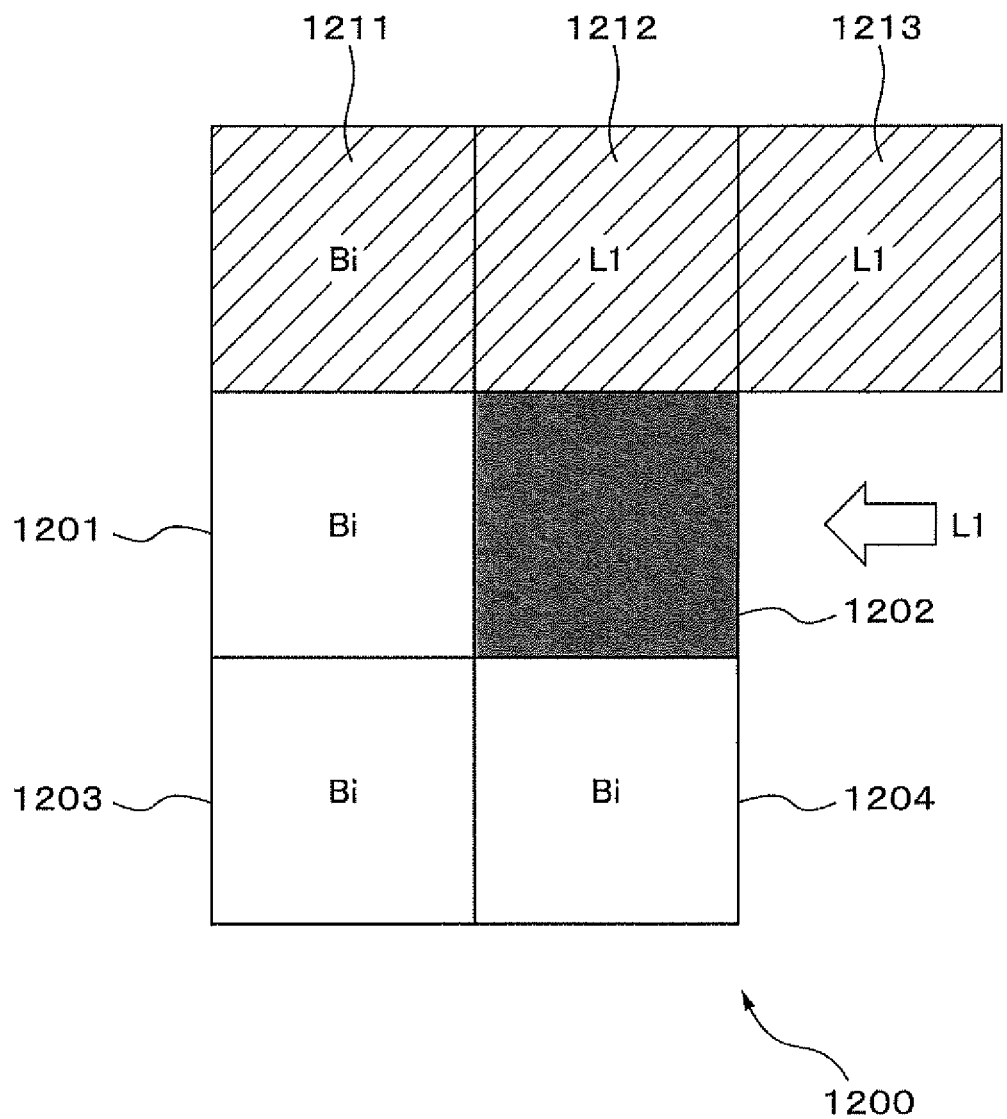
FIG. 11 illustrates an example of a prediction direction determination according to a variation example.

FIG. 11 illustrates an example of a prediction direction determination according to the present variation example. In this example, a PU-of-interest 1200 has been divided into four subblocks 1201 through 1204, and the upper right subblock 1202 is an occlusion region and a bidirectional prediction mode is applied to the other subblocks. The three PUs 1211 through 1213 that have been encoded and that are adjacent to the occlusion region 1202 are referred to in this example. A bidirectional prediction mode has been applied to the PU 1211 from among the three PUs 1211 through 1213, and an L1-directional unidirectional prediction mode has been applied to the PUs 1212 and 1213. Thus, the L1 direction is the most frequent prediction direction. The reference-direction determination circuit 133 then sets the L1 direction as the prediction direction for the occlusion region 1202.

In the present variation example, the reference-direction determination circuit 222 of the video decoding device 2 as well determines a prediction direction to be applied to the occlusion region by performing a process similar to that performed by the reference-direction determination circuit 133. In the determination, the reference-direction determination circuit 222 refers to syntax representing the prediction direction restored by the entropy decoder 21 for the PU that is referred to and that is around a PU including the occlusion region.

The present variation example eliminates the need for the video coding device 1 to add, to an encoded bitstream, information representing the prediction direction for the occlusion region. Thus, the present variation example further increases the coding efficiency.

The present variation example may employ a configuration in which the reference-direction determination circuit 222 uses the above embodiment to determine a prediction direction in which reference is made for an occlusion region when other PUs that have received inter-prediction coding do not exist around the PU of interest.

Also, the value of each pixel in coding-target video data may be expressed by a different color coordinate system such as an RGB color coordinate system in the above embodiment and variation examples. For example, when the value of each pixel in coding-target video data is expressed by an RGB color coordinate system, the video coding device 1 and the video decoding device 2 may perform, on a green (G) component, the same process as that performed on a luminance component in the above embodiment or variation examples. The video coding device 1 and the video decoding device 2 may also perform, on a red (R) component and a blue (B) component, the same process as that performed on each color-difference component in the above embodiment or variation examples. In such a case, a green component is an additional example of a first component, and red and blue components are additional examples of second components.

Figure 12:
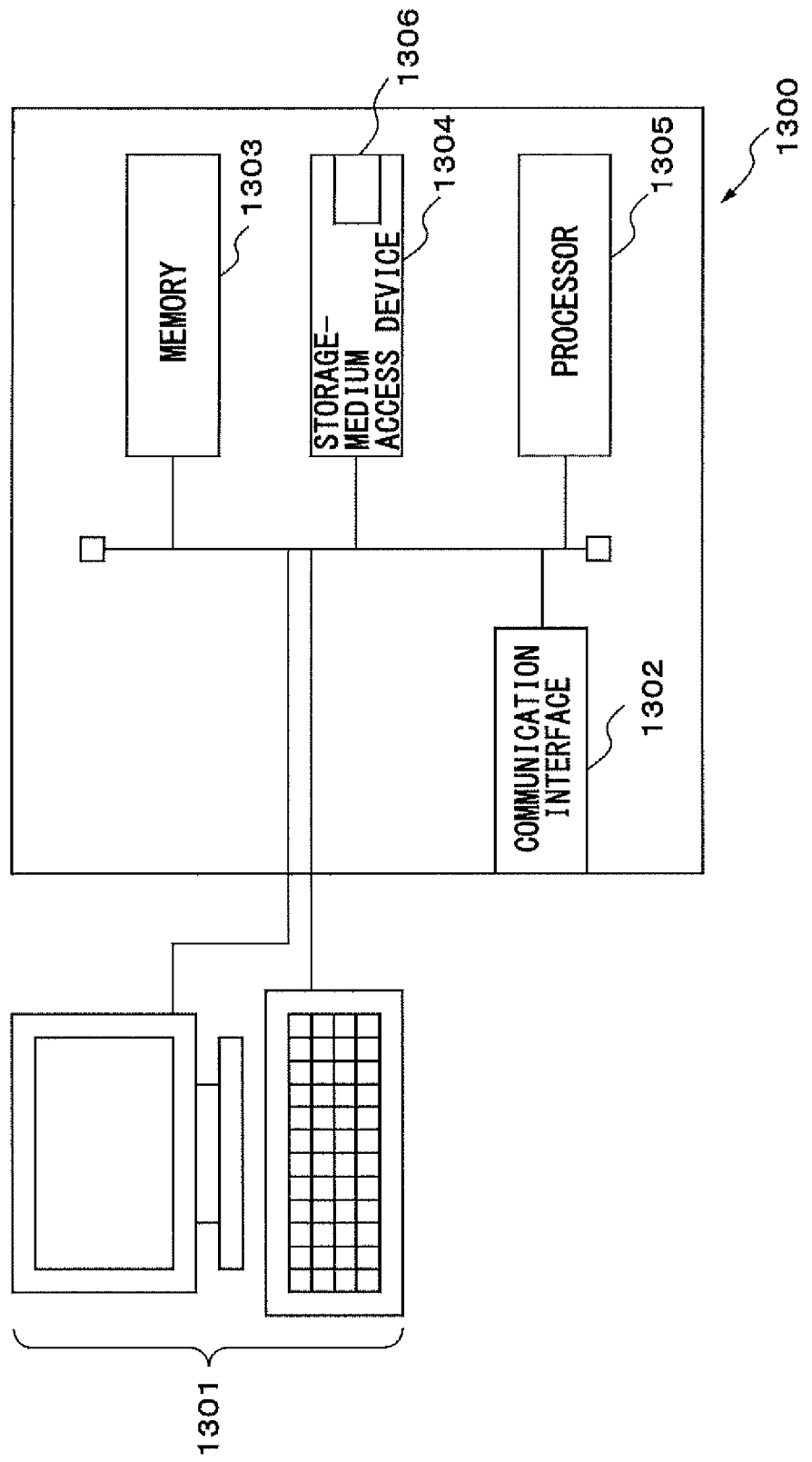
FIG. 12 illustrates a configuration of a computer that operates as a video coding device or a video decoding device according to an embodiment or a variation example thereof with the operation of a computer program that implements the functions of the constituents of the video coding device or the video decoding device.

FIG. 12 illustrates a configuration of a computer that operates as the video coding device or the video decoding device according to the embodiment or a variation example thereof by executing a computer program that implements the functions of the constituents of the video coding device or the video decoding device.

A computer 1300 includes a user interface 1301, a communication interface 1302, a memory 1303, a storage-medium access device 1304, and a processor 1305. The processor 1305 is connected to the user interface 1301, the communication interface 1302, the memory 1303, and the storage-medium access device 1304 through for example a bus.

The user interface 1301 includes for example an input device such as a keyboard, a mouse, etc., and a display device such as a liquid crystal display. Also, the user interface 1301 may include a device, such as a touch panel display, that integratedly includes an input device and a display device. The user interface 1301 for example outputs to the processor 1305 an operation signal for selecting video data to encode or encoded video data to decode, in response to an operation performed by the user. Note that the processor 1305 may determine video data to encode or encoded video data to decode by executing an application program.

The communication interface 1302 includes for example a communication interface circuit, and a control circuit for the communication interface circuit, for the connection to a communication network based on a communication standard such as Ethernet (registered trademark). The communication interface 1302 obtains video data to encode from a different device that is connected to the communication network, and delivers that data to the processor 1305. The communication interface 1302 may also output encoded video data received from the processor 1305 to a different device via the communication network. The communication interface 1302 may also obtain a bit stream including encoded video data that is to be decoded, from a different device connected to the communication network, and deliver that bit stream to the processor 1305.

The memory 1303 is an example of a memory, and includes for example a random-access semiconductor memory and a read-only semiconductor memory. The memory 1303 stores a computer program for implementing a video coding process that is to be executed by the processor 1305 or a computer program for implementing a video decoding process that is to be executed by the processor 1305. The memory 1303 also stores data generated during the video coding process or the video decoding process or generated as a result of such a process.

The storage-medium access device 1304 is another example of a memory, and is for example a device that accesses the storage medium 1306, such as a magnetic disk, a semiconductor memory card, and an optical storage medium. The storage-medium access device 1304 reads for example a computer program for the video coding process or a computer program for the video decoding program, and delivers the read program to the processor 1305, the programs being stored in the storage medium 1306 and executed by the processor 1305.

The processor 1305 includes a least one of for example a Central Processing Unit (CPU), a Graphics Processing Unit (GPU), and a numerical processor. The processor 1305 also executes a computer program for the video coding process according to the above embodiment or variation examples, and thereby encodes video data. The processor 1305 then stores the encoded video data in the memory 1303 or outputs the encoded video data to a different device via the communication interface 1302.

In such a case, the processor 1305 operates as the motion searching circuit 11, the encoding-mode determination circuit 12, the prediction-block generation circuit 13, the predictive encoder 14, the decoder 15, and the entropy encoder 17 illustrated in FIG. 2. The processor 1305 also operates as the block-unit prediction circuit 131, the occlusion-region determination circuit 132, the reference-direction determination circuit 133, and the partial-region-unit prediction circuit 134 illustrated in FIG. 4.

Alternatively, the processor 1305 decodes the encoded video data by executing a computer program for the video decoding process according to the above embodiment or variation examples. The processor 1305 then makes the display device of the user interface 1301 display the decoded picture.

In such a case, the processor 1305 operates as the entropy decoder 21, the prediction-block generation circuit 22, and the decoder 23 illustrated in FIG. 7. The processor 1305 also operates as the occlusion-region determination circuit 221, the reference-direction determination circuit 222, the partial-region-unit prediction circuit 223, and the block-unit prediction circuit 224 illustrated in FIG. 8.

Note that the computer program that can implement, on the processor, the functions of the constituents of the video coding device 1 may be provided in a form that the program is recorded in a portable recording medium. Similarly, the computer program that can implement, on the processor, the functions of the constituents of the video decoding device 2 may be provided in a form that the program is recorded in a portable recording medium.

As described above, a computer-readable recording medium that stores the computer program is a physical (non-transitory) recording medium such as the memory 1303, the storage-medium access device 1304, and a portable recording medium.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A video coding device that encodes a coding-target picture included in video data, the video coding device comprising:
   a region determination circuit configured to determine, for a first block encoded by referring to a first prediction block generated by applying a bidirectional prediction mode for a first component of a pixel value from among a plurality of blocks resulting from dividing the coding-target picture, a partial region to which a unidirectional prediction mode is to be applied for a second component of a pixel value on the basis of a difference value for the first component between corresponding pixels belonging to the first prediction block and the first block;
   a prediction circuit configured to generate a second prediction block for the second component by applying a unidirectional prediction mode to the partial region in the first block and by applying a bidirectional prediction mode to a region that is not the partial region in the first block; and
   an encoder configured to calculate a prediction error for the second component between corresponding pixels belonging to the first block and the second prediction block and to encode the prediction error.

2. The video coding device according to claim 1, wherein the first prediction block is generated, for the first component, by referring to a first reference picture that exists in a first direction from the coding-target picture and that has been encoded and to a second reference picture that exists in a second direction from the coding-target picture and that has been encoded,
   the video coding device further includes a reference-direction determination circuit configured to select a prediction direction to be applied to the partial region in the first block from between the first direction and the second direction, and
   the prediction circuit generates the partial region in the second prediction block on the basis of a reference picture corresponding to the prediction direction that is to be applied to the partial region in the first block from between the first reference picture and the second reference picture.

3. The video coding device according to claim 2, wherein the reference-direction determination circuit determines the first direction to be the prediction direction that is to be applied to the partial region when a first sum is smaller than a second sum, and determines the second direction to be the prediction direction that is to be applied to the partial region when the second sum is smaller than the first sum, the first sum being a sum of absolute values of difference values for the second component between corresponding pixels belonging to a first reference partial region in the first reference picture corresponding to the partial region and the partial region in the first block, and the second sum being a sum of absolute values of difference values for the second component between corresponding pixels belonging to a second reference partial region in the second reference picture corresponding to the partial region and the partial region in the first block.

4. The video coding device according to claim 3, further comprising
   an adding circuit configured to include, in data resulting from encoding the video data, information representing the prediction direction that is to be applied to the partial region.

5. The video coding device according to claim 2, wherein the reference-direction determination circuit determines, to be the prediction direction that is to be applied to the partial region, a most frequent prediction direction from among prediction directions of blocks to which a unidirectional prediction mode has been applied from among blocks other than the first block within a prescribed spatial or temporal range with respect to the first block.

6. The video coding device according to claim 5, wherein the blocks other than the first block within the prescribed range includes at least one of a block that is adjacent to the first block in the coding-target picture or a block located at a position corresponding to the first block in a picture that is immediately earlier than the coding-target picture in an encoding order and that has been encoded.

7. The video coding device according to claim 1, wherein the region determination circuit determines, to be the partial region, a group of pixels for which a difference absolute value for the first component between corresponding pixels belonging to the first block and the first prediction block is greater than or equal to a prescribed threshold.

8. The video coding device according to claim 1, wherein the region determination circuit determines, to be the partial region, a subblock including pixels existing in a number greater than or equal to a prescribed number, the pixels being pixels for which a difference absolute value for the first component between corresponding pixels belonging to the subblock and the first prediction block is greater than or equal to a prescribed threshold, from among a plurality of subblocks resulting from dividing the first block.

9. The video coding device according to claim 8, wherein the region determination circuit determines the subblock that serves as the partial region from among the plurality of subblocks when the first block has a smallest size that allows application of a bidirectional prediction mode.

10. A video decoding device that decodes a decoding-target picture included in encoded video data, the video decoding device comprising:
a region determination circuit configured to determine, for a first block to which a bidirectional prediction mode has been applied for a first component of a pixel value from among a plurality of blocks resulting from dividing the decoding-target picture, a partial region to which a unidirectional prediction mode is to be applied for a second component of a pixel value;
a prediction circuit configured to generate a prediction block for the second component by applying a unidirectional prediction mode to the partial region in the first block and by applying a bidirectional prediction mode to a region that is not the partial region in the first block; and
a decoder configured to generate the second component of each pixel in the first block by adding a value of a corresponding pixel of the prediction block to a prediction error for the second component between corresponding pixels belonging to the first block and the prediction block included in the encoded video data.

11. The video decoding device according to claim 10, wherein
the first component of each pixel in the first block is generated by referring to a decoded first reference picture existing in a first direction from the decoding-target picture and to a decoded second reference picture existing in a second direction from the decoding-target picture,
the video decoding device further includes a reference-direction determination circuit configured to select a prediction direction to be applied to the partial region in the first block from between the first direction and the second direction, and
the prediction circuit generates the partial region in the prediction block on the basis of a reference picture corresponding to the prediction direction that is to be applied to the partial region in the first block from between the first reference picture and the second reference picture.

12. The video decoding device according to claim 11, wherein
the reference-direction determination circuit determines the prediction direction that is to be applied to the partial region in the first block, by referring to information included in the encoded video data and representing the prediction direction that is to be applied to the partial region in the first block.

13. The video decoding device according to claim 11, wherein
the reference-direction determination circuit determines, to be the prediction direction that is to be applied to the partial region, a most frequent prediction direction from among prediction directions of blocks to which a unidirectional prediction mode has been applied from among blocks other than the first block within a prescribed spatial or temporal range with respect to the first block.

14. The video decoding device according to claim 10, wherein
the first component of each pixel in the first block is generated by referring to a decoded first reference picture existing in a first direction from the decoding-target picture and to a decoded second reference picture existing in a second direction from the decoding-target picture and on the basis of a second prediction block generated in a bidirectional prediction mode, and
the region determination circuit determines, to be the partial region, a group of pixels for which a difference absolute value for the first component between corresponding pixels belonging to the first block and the second prediction block is greater than or equal to a prescribed threshold.

15. The video decoding device according to claim 10, wherein
the first component of each pixel in the first block is generated by referring to a decoded first reference picture existing in a first direction from the decoding-target picture and to a decoded second reference picture existing in a second direction from the decoding-target picture and on the basis of a second prediction block generated in a bidirectional prediction mode, and
the region determination circuit determines, to be the partial region, a subblock including pixels existing in a number greater than or equal to a prescribed number, the pixels being pixels for which a difference absolute value for the first component between corresponding pixels belonging to the subblock and the second prediction block is greater than or equal to a prescribed threshold, from among a plurality of subblocks resulting from dividing the first block.

16. The video decoding device according to claim 15, wherein
the region determination circuit determines the subblock that serves as the partial region from among the plurality of subblocks when the first block has a smallest size that allows application of a bidirectional prediction mode.

17. A video coding method that encodes a coding-target picture included in video data, the video coding method comprising:
determining, by a video coding device and for a first block encoded by referring to a first prediction block generated by applying a bidirectional prediction mode for a first component of a pixel value from among a plurality of blocks resulting from dividing the coding-target picture, a partial region to which a unidirectional prediction mode is to be applied for a second component of a pixel value on the basis of a difference value for the first component between corresponding pixels belonging to the first prediction block and the first block;
generating, by the video coding device, a second prediction block for the second component by applying a unidirectional prediction mode to the partial region in the first block and by applying a bidirectional prediction mode to a region that is not the partial region in the first block;

calculating, by the video coding device, a prediction error for the second component between corresponding pixels belonging to the first block and the second prediction block; and encoding the prediction error by the video coding device.

18. A video decoding method that decodes a decoding-target picture included in encoded video data, the video decoding method comprising:

determining, by a video decoding device and for a first block to which a bidirectional prediction mode has been applied for a first component of a pixel value from among a plurality of blocks resulting from dividing the decoding-target picture, a partial region to which a unidirectional prediction mode is to be applied for a second component of a pixel value;

generating, by the video decoding device, a prediction block for the second component by applying a unidirectional prediction mode to the partial region in the first block and by applying a bidirectional prediction mode to a region that is not the partial region in the first block; and generating, by the video decoding device, the second component of each pixel in the first block by adding a value of a corresponding pixel of the prediction block to a prediction error for the second component between corresponding pixels belonging to the first block and the prediction block included in the encoded video data.

19. A non-transitory computer-readable recording medium having stored therein a video-encoding computer program that causes a computer to execute a process comprising:

determining, for a first block encoded by referring to a first prediction block generated by applying a bidirectional prediction mode for a first component of a pixel value from among a plurality of blocks resulting from dividing a coding-target picture included in video data, a partial region to which a unidirectional prediction mode is to be applied for a second component of a pixel value on the basis of a difference value for the first component between corresponding pixels belonging to the first prediction block and the first block;

generating a second prediction block for the second component by applying a unidirectional prediction mode to the partial region in the first block and by applying a bidirectional prediction mode to a region that is not the partial region in the first block;

calculating a prediction error for the second component between corresponding pixels belonging to the first block and the second prediction block; and encoding the prediction error.

20. A non-transitory computer-readable recording medium having stored therein a video-decoding computer program that causes a computer to execute a process comprising:

determining, for a first block to which a bidirectional prediction mode has been applied for a first component of a pixel value from among a plurality of blocks resulting from dividing a decoding-target picture included in encoded video data, a partial region to which a unidirectional prediction mode is to be applied for a second component of a pixel value;

generating a prediction block for the second component by applying a unidirectional prediction mode to the partial region in the first block and by applying a bidirectional prediction mode to a region that is not the partial region in the first block; and generating the second component of each pixel in the first block by adding a value of a corresponding pixel of the prediction block to a prediction error for the second component between corresponding pixels belonging to the first block and the prediction block included in the encoded video data.

* * * * *